US012718449B2

(12) United States Patent
Favazza et al.

(10) Patent No.: US 12,718,449 B2
(45) Date of Patent: Aug. 25, 2026

(54) METAL ARTIFACT REDUCTION ALGORITHM FOR CT-GUIDED INTERVENTIONAL PROCEDURES

(71) Applicant: Mayo Foundation for Medical Education and Research, Rochester, MN (US)

(72) Inventors: Christopher P. Favazza, Rochester, MN (US); Andrea Ferrero, Rochester, MN (US); Liqiang Ren, Rochester, MN (US)

(73) Assignee: Mayo Foundation for Medical Education and Research, Rochester, MN (US)

( * ) Notice: Subject to any disclaimer, the term of this patent is extended or adjusted under 35 U.S.C. 154(b) by 297 days.

(21) Appl. No.: 18/546,376

(22) PCT Filed: Feb. 14, 2022

(86) PCT No.: PCT/US2022/016340

§ 371 (c)(1),
(2) Date: Aug. 14, 2023

(87) PCT Pub. No.: WO2022/174155

PCT Pub. Date: Aug. 18, 2022

(65) Prior Publication Data

US 2024/0135603 A1 Apr. 25, 2024

Related U.S. Application Data

(60) Provisional application No. 63/149,054, filed on Feb. 12, 2021.

(51) Int. Cl.

*G06T 12/10* (2026.01)
*G06T 11/60* (2006.01)

(Continued)

(52) U.S. Cl.

CPC .............. *G06T 12/30* (2026.01); *G06T 11/60* (2013.01); *G06T 12/10* (2026.01); *G06V 10/774* (2022.01);

(Continued)

(58) Field of Classification Search

CPC ............. G06T 11/005; G06T 2211/441; G06T 2211/448; G06T 2211/40; G06V 10/82; G06V 10/774; G06V 2201/03

See application file for complete search history.

(56) References Cited

PUBLICATIONS

Zhang et al. "Convolutional neural network-based metal artifact reduction in x-ray computed tomography"; IEEE transactions on medical imaging 37.6 (2018): 1370-1381 (Year: 2018).*

(Continued)

*Primary Examiner* — Sumati Lefkowitz
*Assistant Examiner* — Michael Adam Shariff
(74) *Attorney, Agent, or Firm* — Quarles & Brady LLP

(57) ABSTRACT

Metal artifacts are reduced in x-ray computed tomography ("CT") images using a suitably trained neural network, such as a convolutional neural network ("CNN"). Virtual metal DATA objects are inserted to either the raw projection data or CT image data (e.g., from pre-procedural CT scans) to generate sets of matching artifact-corrupted and artifact-uncorrupted images, and a CNN, or other neural network, is trained to separate the contribution to each image pixel due to patient anatomy, metal object, or metal object-induced artifact. The contributions from metal object-induced artifacts can then be removed to generate a final, artifact-reduced image.

22 Claims, 11 Drawing Sheets

(51) Int. Cl.
*G06T 12/30* (2026.01)
*G06V 10/774* (2022.01)
*G06V 10/82* (2022.01)

(52) U.S. Cl.
CPC ........ *G06V 10/82* (2022.01); *G06T 2211/441* (2023.08); *G06T 2211/448* (2023.08); *G06V 2201/03* (2022.01)

(56) References Cited

PUBLICATIONS

Atwell, Thomas D., et al. (2007). Percutaneous cryoablation of 40 solid renal tumors with US guidance and CT monitoring: initial experience. Radiology 243.1; 276-283.
Chen, B., et al. (2015). Lesion insertion in the projection domain: methods and initial results. Medical physics, 42(12), 7034-7042.
Claus, B. E., et al. (Jun. 2017). Metal-artifact reduction using deep-learning based sinogram completion: initial results. In Proc. 14th Int. Meeting Fully Three-Dimensional Image Reconstruction Radiol. Nucl. Med (pp. 631-634).
Eltorai, A.E., et al. (2017). Computed Tomography-Guided Tumor Ablation: Analysis and Optimization of Computed Tomography Technique With Various Ablation Devices. Journal of computer assisted tomography, 41(2), pp. 279-283.
Ferrero, A., Chen, B., Li, Z., Yu, L. and McCollough, C. (2017), Technical Note: Insertion of digital lesions in the projection domain for dual-source, dual-energy CT. Med. Phys., 44: 1655-1660.
Ghani, M. U., & Karl, W. C. (2018). Deep learning based sinogram correction for metal artifact reduction. Electronic Imaging, 30, 472-1-8.
Ghani, M. U., & Karl, W. C. (2020). Fast enhanced CT metal artifact reduction using data domain deep learning. IEEE Transactions on Computational Imaging, 6, 181-193.
Geschwind, Jean-Francois H., and Michael C. Soulen, eds. Interventional oncology: principles and practice of image-guided cancer therapy. Cambridge University Press, 2016.
Huang, X., Wang, J., Tang, F., Zhong, T., & Zhang, Y. (2018). Metal artifact reduction on cervical CT images by deep residual learning. Biomedical engineering online, 17, 1-15.
Liang, K., Zhang, L., Yang, H., Yang, Y., Chen, Z., & Xing, Y. (2019). Metal artifact reduction for practical dental computed tomography by improving interpolation-based reconstruction with deep learning. Medical Physics, 46(12), e823-e834.
Ren, Liqiang, Andrea Ferrero, and Christopher Favazza. A framework of metal object insertion in the projection domain for interventional CT image quality optimization. Medical Imaging 2021: Image-Guided Procedures, Robotic Interventions, and Modeling. vol. 11598; 1-13. SPIE, 2021.
Sheedy, Shannon P., et al. MR imaging of perianal Crohn disease. Radiology 282.3 (2017): 628-645.
Stattaus, Joerg, et al. CT-guided biopsy of small liver lesions: visibility, artifacts, and corresponding diagnostic accuracy. Cardiovascular and interventional radiology 30 (2007): 928-935.
Yu, L., Shiung, M., Jondal, D., & McCollough, C. H. (2012). Development and validation of a practical lower-dose-simulation tool for optimizing computed tomography scan protocols. Journal of computer assisted tomography, 36(4), 477-487.
Zhang, Y., & Yu, H. (2018). Convolutional neural network based metal artifact reduction in x-ray computed tomography. IEEE transactions on medical imaging, 37(6), 1370-1381.
Zhu, Linlin, et al. "Metal artifact reduction for x-ray computed tomography using U-net in image domain." IEEE Access 7 (2019): 98743-98754.
PCT International Search Report, PCT/US2022/016340, mailed on Jun. 15, 2022, 3 pages.
PCT Written Opinion of the International Search Authority, PCT/US2022/016340, mailed on Jun. 15, 2022, 6 pages.

* cited by examiner

802

ACCESS TRAINING DATA

804

TRAIN SECOND NEURAL NETWORK ON TRAINING DATA

806

STORE SECOND NEURAL NETWORK

METAL ARTIFACT REDUCTION ALGORITHM FOR CT-GUIDED INTERVENTIONAL PROCEDURES

BACKGROUND

Image artifacts caused by metallic ablation devices during CT-guided interventional oncology ("IO") procedures can significantly impact radiologist confidence in probe placement, as well as treatment assessment during ablation. Current strategies that may reduce metal-induced image artifacts are either limited in their effectiveness or too slow for CT-guided interventional procedures.

SUMMARY OF THE DISCLOSURE

The present disclosure addresses the aforementioned drawbacks by providing a method for generating a metal artifact reduced image. Computed tomography ("CT") image data are accessed with a computer system. These CT image data were acquired from a subject using a CT imaging system and depict anatomy of the subject, a metal object present in the subject, and artifacts caused by the metal object. A trained neural network is accessed with the computer system, where the trained neural network has been trained on training data in order to separate anatomy and metal objects from artifacts caused by metal objects. The CT image data are input to the trained neural network, generating output as artifact-reduced image data depicting the anatomy of the subject and the metal object, wherein the artifacts caused by the metal object are reduced.

It is another aspect of the present disclosure to provide a method for generating an image that depicts a virtual metal object and corresponding artifacts. CT projection data are accessed with a computer system, where the CT projection data are acquired from a subject using a CT imaging system. Virtual metal object projection data are also accessed with the computer system, where the virtual metal object projection data include a forward projection of a virtual model of a metal object. Combined projection data are generated by combining the CT projection data and the virtual metal object projection data while using a beam hardening model to account for beam hardening effects attributable to the virtual model of the metal object in the combined projection data and a noise model to account for noise effects attributable to the virtual model of the metal object in the combined projection data. The noise model inserts both quantum noise and electronic noise. An image is reconstructed from the combined projection data, where the image depicts anatomy of the subject, the virtual metal object, and artifacts corresponding to the virtual metal object.

It is still another aspect of the present disclosure to provide another method for generating a metal artifact reduced image. CT image data are accessed with a computer system. These CT image data were acquired from a subject using a CT imaging system and depict anatomy of the subject, a metal object present in the subject, and artifacts caused by the metal object. A first trained neural network is accessed with the computer system, where the first trained neural network has been trained on training data in order to separate anatomy from metal objects and artifacts caused by metal objects. The CT image data are input to the first trained neural network, generating output as anatomy image data depicting the anatomy of the subject and artifact containing metal object image data depicting the metal object and artifacts caused by the metal object. A second trained neural network is accessed with the computer system, where the second trained neural network being trained on training data in order to separate metal objects from artifacts caused by metal objects. The artifact containing metal object image data are input to the second trained neural network, generating output as metal object image data depicting the metal object and artifact image data depicting the artifacts caused by the metal object. A combined image is generated by combining the anatomy image data and the metal object image data with the computer system, wherein the combined image depicts the anatomy of the subject and the metal object without the artifacts caused by the metal object.

The foregoing and other aspects and advantages of the present disclosure will appear from the following description. In the description, reference is made to the accompanying drawings that form a part hereof, and in which there is shown by way of illustration a preferred embodiment. This embodiment does not necessarily represent the full scope of the invention, however, and reference is therefore made to the claims and herein for interpreting the scope of the invention.

DETAILED DESCRIPTION

Figure 1:
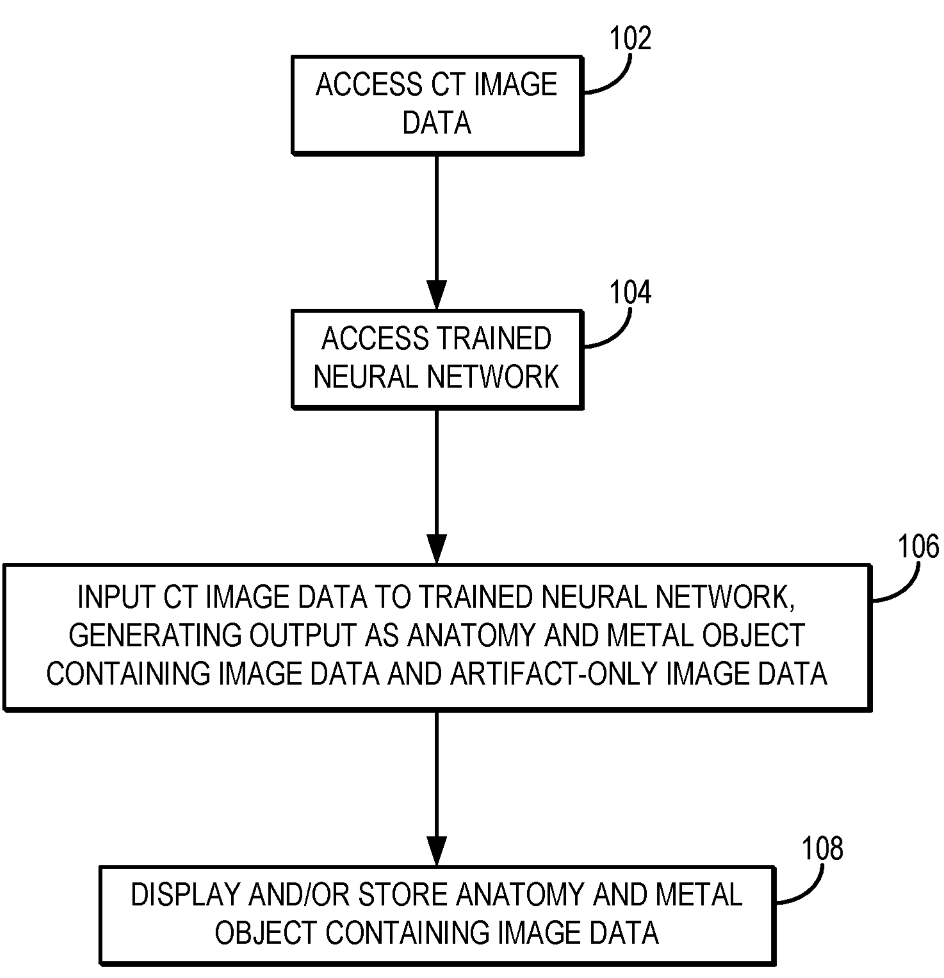
FIG. 1 is a flowchart setting forth the steps of an example method for reducing metal artifacts in an image obtained with a computed tomography ("CT") imaging system using a single model technique.

Described here are systems and methods for reducing metal artifacts in x-ray computed tomography ("CT") images using a suitably trained neural network, such as a convolutional neural network ("CNN"). Virtual metallic probes are added to either the raw projection data or the reconstructed image data (e.g., from pre-procedural clinical CT scans) and a training set is generated with matching images differing by the presence of probe-induced artifacts. A CNN, or other neural network, is then trained to identify the contribution to each image pixel due to the probe-induced artifact. The contribution from probe-induced artifacts can then be removed to generate a final, artifact-reduced image. The systems and methods described in the present disclosure are particularly advantageous for interventional oncology and other CT-guided interventional applications.

In general, the metal artifact reduction systems and methods described in the present disclosure implement one or more CNN models, or other neural network models. In one example, a single CNN, or other neural network, model is trained on sets of patient data with virtually inserted metal probes in either raw (i.e., projection) data or image data. CT images reconstructed from the projection data that contain accurately inserted virtual metal object(s) will contain image artifacts similar to real CT images containing actual metal objects. Alternatively, CT images generated by combining the original CT image data with accurate masks of metallic objects and their induced artifacts will also contain image artifacts similar to real CT images containing actual metal objects. On the other hand, CT images obtained by inserting segmented virtual metallic object(s) directly in the image domain will not contain any artifacts. In these embodiments, then, the CNN model learns to output data without any metal object-induced artifacts from input data that do contain metallic object-induced artifacts. The training data can include a wide variety of metallic probes used for percutaneous microwave- and cryoablations or other CT-guided interventional procedures, and can be extended to different CT scanner models or additional probes.

In another example, two CNN, or other neural network, models can be used. For instance, a first CNN model is trained on sets of patient data with and without virtually inserted metal probes, and learns to output data without any probe or artifacts from data that contain them. The training data can include a wide variety of metallic probes used for percutaneous microwave- and cryoablations or other CT-guided interventional procedures, and can be extended to different CT scanner models or additional probes. A second CNN model implements a segmentation CNN algorithm, trained on phantom data on the same probes used when training the first CNN above. Additionally or alternatively, each probe can be manually segmented from the generated artifact using a very wide display window, and the generated mask can be incorporated into the model. The algorithm replaces image pixels that were assigned to the probe in the anatomy-only image data in order to obtain a final image dataset that contains the patient anatomy and the probe, with no artifact.

The systems and methods described in the present disclosure provide several advantages over existing methods. The fast processing speed of the disclosed techniques is advantageous for applications in CT-guided interventional oncology. The techniques described in the present disclosure are capable of displaying a post-processed image series to the radiologist workstation within a few seconds, including image transfer. Additionally, the systems and methods described in the present disclosure do not rely on prior planning CT data for reference and, therefore, overcome issues caused by organ motion or displacement during the CT-guided procedure. Further, unlike traditional metal artifact reduction algorithms, the techniques described in the present disclosure are specifically trained to recognize and remove the artifacts caused by one or more different metallic probe types used in CT-guided interventional procedures.

In this way, the systems and methods described in the present disclosure provide a framework of metal object insertion in the projection domain for interventional CT image quality optimization. By accurately simulating the appearance of metallic objects and their induced image artifacts regardless of their number, type, and relative orientation, such a metal insertion framework can provide a number of different advantages to clinical practice.

The framework for inserting virtual metal objects to CT projection data is adapted from prior tools for inserting liver lesions, lung nodules, and renal stones into patient projection data from single-energy and dual-energy CT scans. Compared to previous lesion and kidney insertion applications, metal object insertion presents several significant challenges, which are addressed by the techniques described in the present disclosure. For example, the volume of interest ("VOI") containing the segmented metallic probe is necessarily much larger than VOIs of soft tissue lesions and kidney stones, and the metal objects are significantly more attenuating than cancerous lesions—yielding CT numbers in excess of thousands of HU as compared to about 50 HU or less for common lesions. As a result, forward projection of a large VOI containing high-attenuating probes more significantly affects the baseline sinogram to which the probe is added. These perturbations include effects of the inserted object on quantum noise, electronic noise, and beam hardening, which are inconsequential for lesion insertion tasks and are therefore ignored in lesion insertion models.

It is another aspect of the present disclosure to provide a framework for generating matching datasets containing virtual metallic probes with and without probe-induced artifacts directly into image data and without access to projection data. In these instances, test objects containing uniform background (e.g., air or water) are scanned with and without metallic probes. The order of the acquisitions is predetermined to ensure the metallic probes are not displaced between scans, thereby providing for accurate registration. Image subtraction from the reconstructed images with and without the metallic probes allows for artifact-free probe masks (e.g., from air background) to be generated, as well as probe masks that also contain the probe-induced artifacts (e.g., from water background). Masks for an arbitrary number of probes and orientations can be generated with this methodology. Advantageously, access to proprietary vendor data is not required for this method.

Referring now to FIG. 1, a flowchart is illustrated as setting forth the steps of an example method for reducing metal artifacts in x-ray CT images using a single, suitably trained neural network or other machine learning algorithm.

The method includes accessing CT image data with a computer system, as indicated at step 102. Accessing the CT image data may include retrieving such data from a memory or other suitable data storage device or medium. Alternatively, accessing the CT image data may include acquiring such data with a CT imaging system and transferring or otherwise communicating the data to the computer system, which may be a part of the CT imaging system.

In general, the CT image data contain images of a subject that have been acquired with a CT imaging system. In addition to depicting the subject's anatomy, the images also depict the presence of metal objects and the corresponding metal object artifacts. As one non-limiting example, the metal object depicted in the images can be an interventional probe (e.g., an ablation probe). In these instances, the method will remove the artifacts generated by the presence of the metal object, while retaining the visualization of the metal object within the images.

A trained neural network (or other suitable machine learning algorithm) is then accessed with the computer system, as indicated at step 104. Accessing the trained neural network may include accessing network parameters (e.g., weights, biases, or both) that have been optimized or otherwise estimated by training the neural network on training data. In some instances, accessing the first neural network can also include retrieving, constructing, or otherwise accessing the particular neural network architecture to be implemented. For instance, data pertaining to the layers in the neural network architecture (e.g., number of layers, type of layers, ordering of layers, connections between layers, hyperparameters for layers) may be retrieved, selected, constructed, or otherwise accessed.

In general, the neural network is trained, or has been trained, on training data in order to separate anatomy and metal objects from the corresponding metal object artifacts. As such, the output data generated by the neural network includes artifact-reduced images of the subject's anatomy and metal objects that are present in the subject.

The CT image data (e.g., from a CT-guided interventional procedure) depicting the subject's anatomy, one or more metal object(s) (e.g., one or more metallic probes placed by an interventional radiologist), and the resulting metal object-induced artifacts, are input to the trained neural network, generating output as images that have removed the contribution of the metal object-induced artifacts to each pixel in the CT image data, as indicated at step 106.

Within the context of interventional oncology, or other CT-guided interventional procedures, these artifact-reduced CT images are advantageous because they allow for reliable visualization and positioning of interventional instruments during a procedure, without the deleterious effects of artifacts created by the presence of the metal object(s) in the subject The artifact-reduced images containing the anatomy and metal object(s) can then displayed to a user, stored for later use or further processing, or both, as indicated at step 108. For instance, the anatomy and metal object containing image data can be displayed to a user during an interventional procedure in order to provide for visualization and guidance of a metallic interventional instrument during a procedure.

Figure 2:
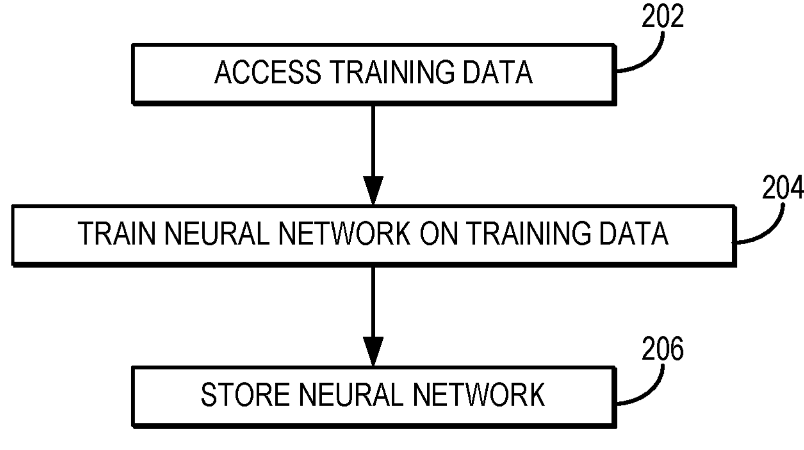
FIG. 2 is a flowchart setting forth the steps of an example method for training a neural network to separate anatomy and metal objects depicted in a CT image from artifacts corresponding to the metal objects that are present in the CT image.

Referring now to FIG. 2, a flowchart is illustrated as setting forth the steps of an example method for training a neural network (or other suitable machine learning algorithm) on training data, such that the neural network is trained to receive input as metal artifact-corrupted CT images in order to generate output as artifact-reduced images depicting the subject's anatomy and the metal object(s) depicted in the input images with the artifacts corresponding to the presence of the metal object(s) having been removed or otherwise reduced.

In general, the neural network(s) can implement any number of different neural network architectures. For instance, the neural network(s) could implement a convolutional neural network, a residual neural network, and so on. In some instances, the neural network(s) may implement deep learning. Alternatively, the neural network(s) could be replaced with other suitable machine learning algorithms, such as those based on supervised learning, unsupervised learning, ensemble learning, and so on.

The method includes accessing training data with a computer system, as indicated at step 202. Accessing the training data may include retrieving such data from a memory or other suitable data storage device or medium. Alternatively, accessing the training data may include acquiring such data with a CT imaging system and transferring or otherwise communicating the data to the computer system, which may be a part of the CT imaging system.

In general, the training data can include pre-procedural or diagnostic images of the subject, and copies of the pre-procedural or diagnostic images to which one or more virtual metal objects has been inserted. An example method for inserting virtual metal objects to CT images is described below in more detail. Virtual metal objects can be inserted in projection CT data, image CT data, or both. When training a single neural network model, the training data can preferably include matching image sets that are different by the presence of metal-induced artifactual signals in the images (e.g., artifact-corrupted images and uncorrupted images). The artifact-corrupted images are generated by virtually inserting metal objects in the projection domain, such that the artifact-corrupted images depict the subject's anatomy, the virtually inserted metal object(s), and artifacts corresponding to the virtually inserted metal object(s). Additionally or alternatively, artifact-corrupted images can be generated by inserting virtual metal objects and corresponding artifacts in the image domain. On the other hand, the uncorrupted images are generated by virtually inserting the same metal object(s) (e.g., segmented to avoid the presence of any metal-induced artifact) to the pre-procedural or diagnostic images in the image domain. In this way, the uncorrupted images depict the subject's anatomy and the virtually inserted metal object(s) without any artifacts corresponding to the virtually inserted metal object(s). In both the artifact-corrupted and uncorrupted images, the metal object(s) are inserted to the same locations.

In some embodiments, the training data can include cloned data generated using data augmentation. As an example, the cloned data can be generated by making copies of the images in the training data while altering or modifying each copy of the images. For instance, cloned data can be generated using data augmentation techniques, such as adding noise to the original images, performing a deformable transformation (e.g., translation, rotation, both) on the original images, smoothing the original images, applying a random geometric perturbation to the original images, combinations thereof, and so on.

A neural network (or other suitable machine learning algorithm) is then trained on the training data, as indicated at step 204. In general, the neural network can be trained by optimizing network parameters (e.g., weights, biases, or both) based on minimizing a loss function. As one non-limiting example, the loss function may be a mean squared error loss function.

Training a neural network may include initializing the neural network, such as by computing, estimating, or otherwise selecting initial network parameters (e.g., weights, biases, or both). Training data can then be input to the initialized neural network, generating output as anatomy-only images and artifact containing metal object images. The quality of the output images can then be evaluated, such as by passing the output images to the loss function to compute an error. The current neural network can then be updated based on the calculated error (e.g., using backpropagation methods based on the calculated error). For instance, the current neural network can be updated by updating the network parameters (e.g., weights, biases, or both) in order to minimize the loss according to the loss function. When the error has been minimized (e.g., by determining whether an error threshold or other stopping criterion has been satisfied), the current neural network and its associated network parameters represent the trained neural network.

Figure 3A:
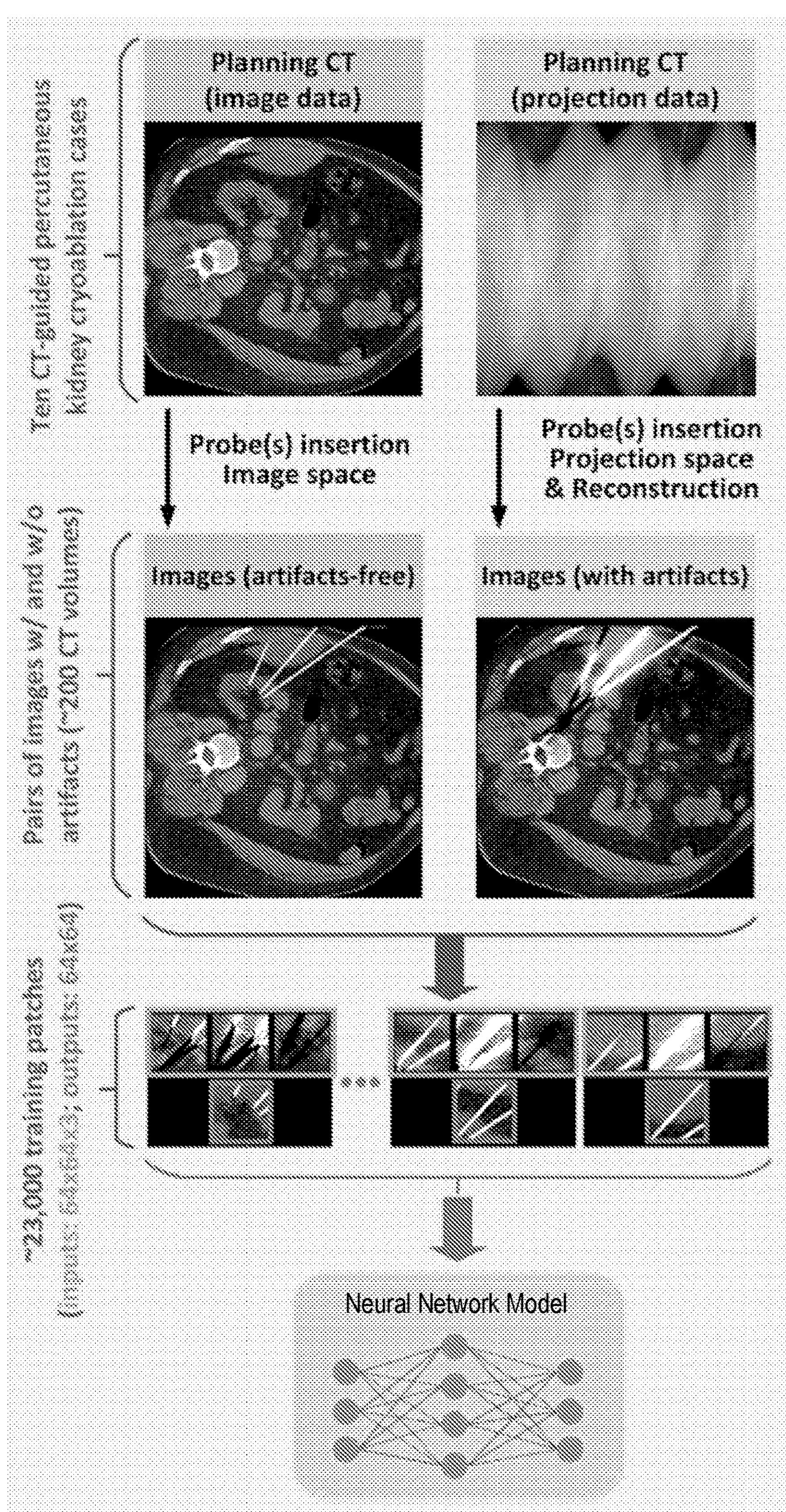
FIG. 3A shows an example neural network training data and pre-processing process that can be implemented in some embodiments described in the present disclosure.
Figure 3B:
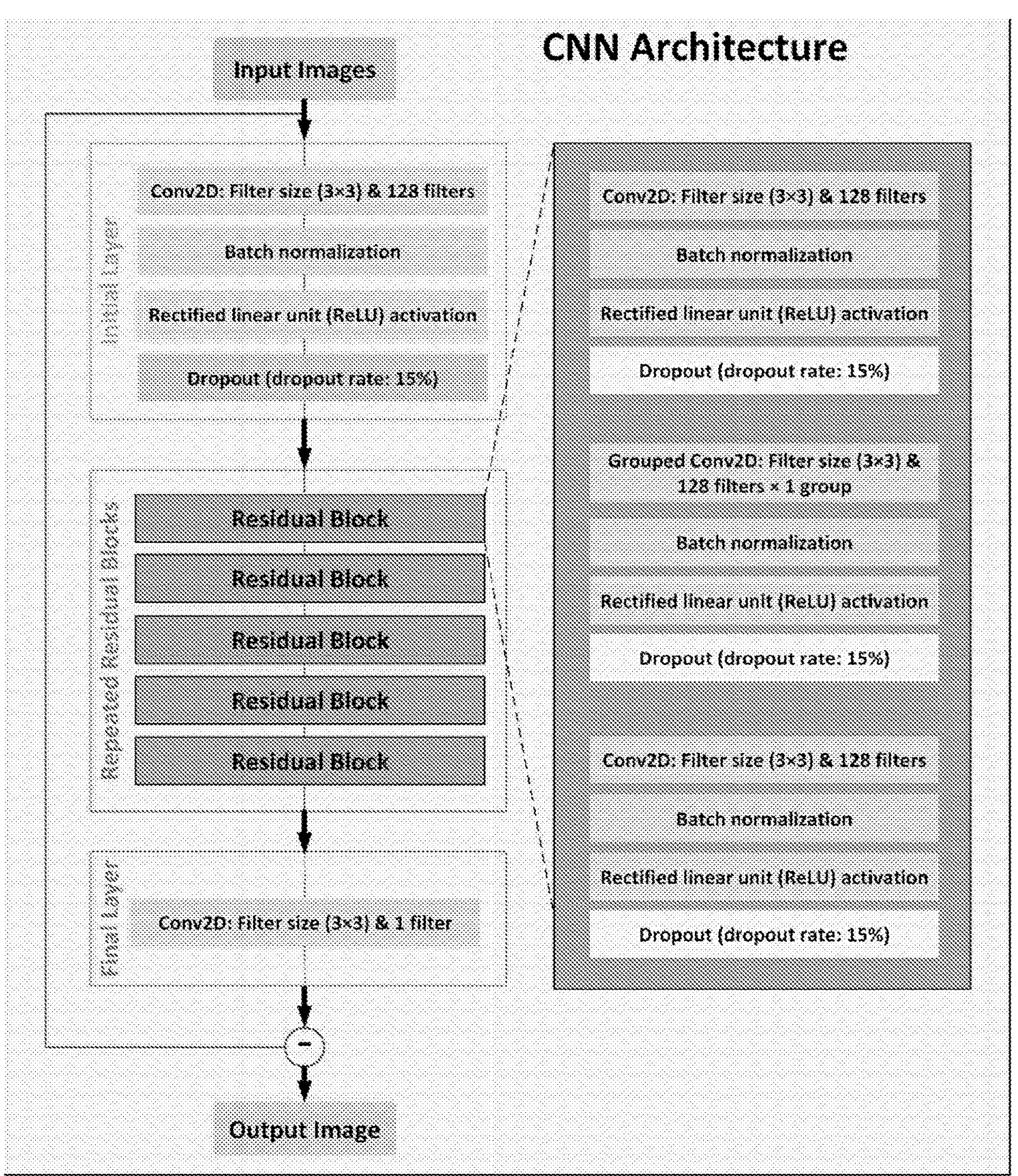
FIG. 3B shows an example convolutional neural network architecture that can be implemented in some embodiments described in the present disclosure.

As a non-limiting example, the neural network may be a convolutional neural network ("CNN"). In some instances, the CNN may be a residual CNN. For example, FIGS. 3A and 3B illustrate a schematic diagram of an example CNN training data generation and pre-processing (FIG. 3A). In this illustrated example, up to 4 intersecting cryoablation probes are artificially inserted in multiple positions and/or orientations into projection (images with artifacts; training input) and in image (artifact-free images; training target) CT data, respectively, generating a total of ~200 CT volumes and approximately 23,000 training patches for model training. For instance, in an example implementation, based on all axial images selected for CNN training, matched image patches were cropped by sliding a two-dimensional ("2D") window with a size of 64×64 pixels over the entire image at a step of 16 pixels in both horizontal and vertical directions. A threshold of 5% of the total pixels (i.e., 64×64×5%=≅205 pixels) was set to exclude those patches with none or minimal impacts from the metal artifacts. Approximately 23,000 sets of matched training patches were generated as CNN training inputs/targets. To appreciate the spatial correlation and continuity of the probes as well as the introduced artifacts, the central slice and the two spatially adjacent slices before and after it were concatenated in the input channel, while only the corresponding artifacts-free central slice was contained in the target channel. All generated training patches were supplied to the model for training. The schematic diagram of the training data generation and pre-processing is summarized in FIG. 3A with example images and patches.

FIG. 3B shows an example CNN architecture that includes an initial convolutional layer, five repeated residual blocks, and a final convolutional layer. In this example, a residual CNN architecture with strong performance for image recognition and feature extraction was employed to identify and remove the metal artifacts. The network was also capable of reserving feature maps containing small-scale anatomical details from the initial layers propagating to the final image and demonstrated its effectiveness for noise reduction and kernel synthesis in CT imaging.

As described in FIG. 3B, the network was designed to be adaptive to arbitrarily sized image volumes as inputs. Specifically in the illustrated example, the network was trained on cropped image patches (64 pixels×64 pixels×3 channels), and validated and tested on full size images (512 pixels×512 pixels×3 channels). After the initial convolutional layer, a total of 128 feature maps were generated and then passed through five identical residual blocks, each formulated by three convolutional layers. While the bottom and the top layers were identical to the initial layer, the middle layer in each residual block was based on an aggregated group convolution to improve the performance of residual networks by splitting the feature maps into multiple different subgroups each associated with an independent convolutional filter. In some implementations, the strategy of grouped convolution can be disabled to achieve faster inferences for time-sensitive applications (e.g., time-sensitive interventional oncology ("IO") applications). Batch normalization, rectified linear unit ("ReLU") activation, and dropout (dropout rate: 15%) were sequentially applied after the initial layer and each layer in residual blocks. A final convolutional layer with a single filter was applied to project the 128 feature maps back into the image domain. The direct CNN output containing the differences between training inputs and targets, namely the metal artifacts, was then subtracted from the inputs to produce the final images with metal artifacts removed.

In an example implementation, the model was trained for 150 epochs. The network weights were updated using an Adam optimizer with default parameters and learning rates starting at 0.001 and decreasing to 0.0001 after the first 100 epochs. Over 2 million parameters (trainable and non-trainable) constructing the model were tuned by minimizing a modified loss function linearly combining a regular pixel-wise mean squared error ("MSE") and a special MSE exclusively considering the pixels within the CT abdominal window [−160, 240 HU] between the final CNN output image (artifacts-removed) and the reference image (artifact-free). Full axial slices with obvious metal artifacts from the reserved validation dataset were used to monitor the training performance.

As noted, a residual CNN architecture can be employed to identify and remove the metal artifacts. To improve the performance of residual networks, an aggregated group convolution can be built in each residual block. For example, 256 feature maps can be split into 32 different groups each with 8 independent convolutional filters in CT image kernel synthesis, and 128 feature maps can be split into 8 different groups each with 16 independent convolutional filters in CT image denoising. The strategy of grouped convolution can be disabled in some implementations of the neural network model by assigning a single group with 128 independent convolutional filters in an effort to accelerate imaging processing in inferences for time-sensitive IO applications.

Referring again to FIG. 2, the trained neural network is then stored for later use, as indicated at step 206. Storing the neural network may include storing network parameters (e.g., weights, biases, or both), which have been computed or otherwise estimated by training the neural network on the training data. Storing the trained neural network may also include storing the particular neural network architecture to be implemented. For instance, data pertaining to the layers in the neural network architecture (e.g., number of layers, type of layers, ordering of layers, connections between layers, hyperparameters for layers) may be stored.

Figure 4:
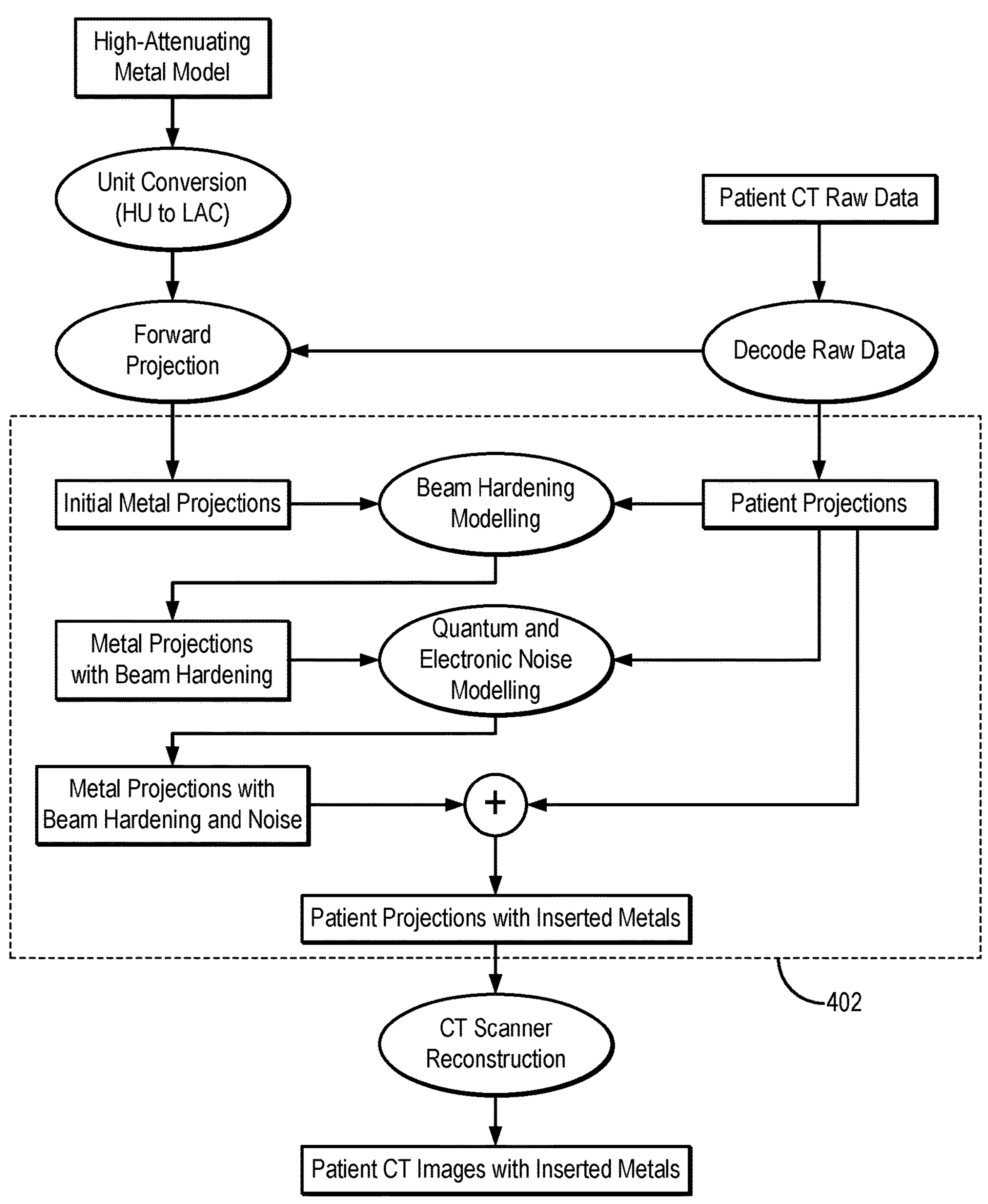
FIG. 4 illustrates a framework for inserting a virtual metal object into CT projection data.
Figure 5A:
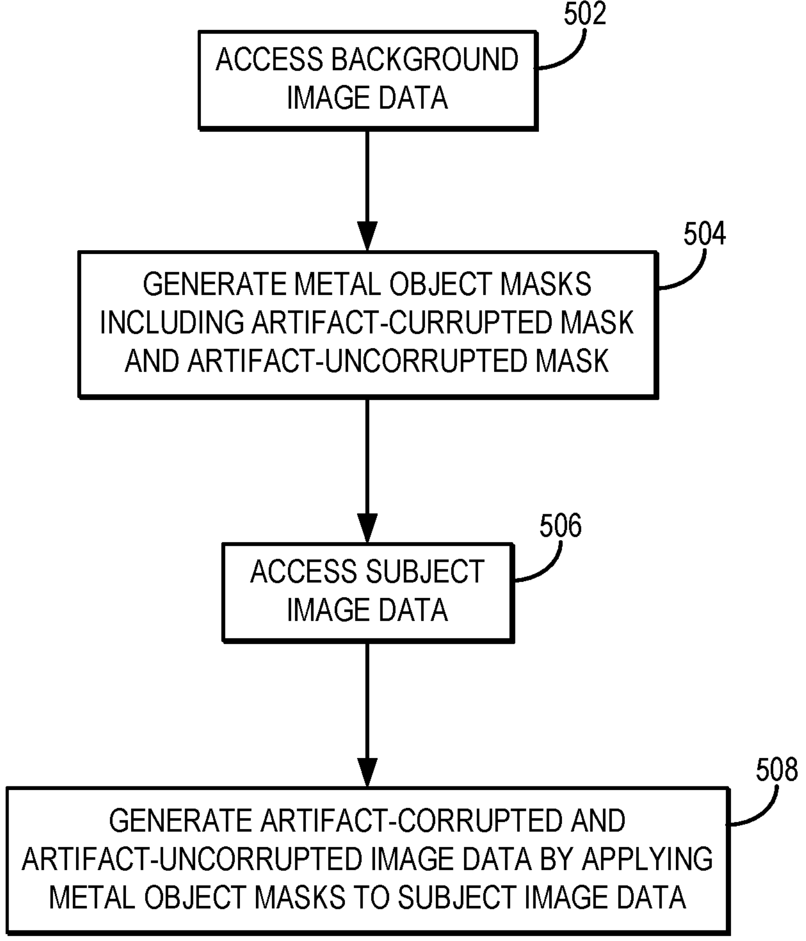
FIG. 5A shows a flowchart of an example method for inserting a virtual metal object into CT image data.
Figure 5B:
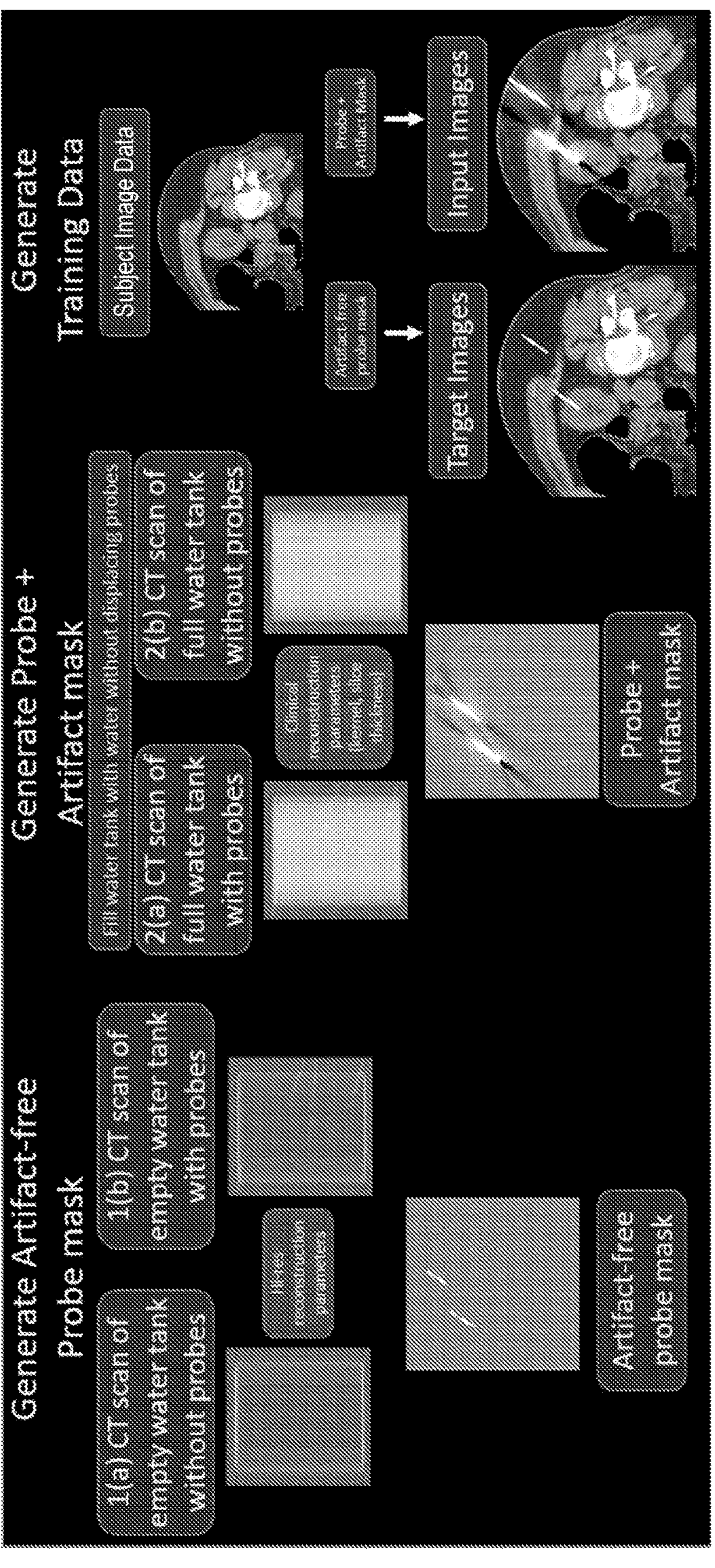
FIG. 5B illustrates an example workflow for inserting a virtual metal object into CT image data.

Referring now to FIG. 4, an example framework for inserting virtual metal objects into CT projection data is shown. In general, a voxelized high-attenuating metal object model is forward projected to acquire the initial object projections, which are then corrected and combined with original CT projections. These corrections to the projection data are highlighted by the processing block 402 in FIG. 4 and include the models accounting for increased quantum noise, electronic noise, and beam hardening in the presence of the metal object. Details about these corrections in the model are described below in more detail. The final combined projections containing the inserted metal objects can be reformatted to match that of commercial CT raw data and reconstructed to yield images simulating the presence of the metal objects.

As described above, after metal object insertion, the projection data are corrected for increased quantum and electronic noise. An additional noise element for each line integral intersecting the metal object $P_m$(pr,i, j) can be incorporated, where pr is the index of projection, and i and j denote the indices of detector bins along the axial and longitudinal directions, respectively. The noise element, $p_{in}$(pr,i, j) is incorporated to account for the increased contributions of quantum (and in some cases electronic) noise, which is caused by the extremely high attenuation values of the metal object. As one non-limiting example, the following noise insertion model can be implemented:

$$P_n = \frac{1}{N_0 \exp(-P_{or})}\sqrt{N_e[\exp(2P_m)-1] + N_0\exp(-P_{or})[\exp(P_m)-1]}\,x; \quad (1)$$

where $N_0$ and $N_e$ are the incident photon number and the noise-equivalent quanta of the electronic noise floor, respectively; $P_{or}$ corresponds to the line integral of original projection; and x is a normally distributed stochastic process with a zero mean and unit variance.

As also described above, after metal object insertion, the projection data are also corrected for increased beam hardening. In one example, the beam hardening model can be predicted on parameters derived from the forward projections of the digital metal model and the original projections decoded from original CT raw data, and determined in three steps. First, the expected polychromatic x-ray spectrum that would have been recorded by the x-ray detector (i, j) during projection, pr, if the metal object were physically present in the original projections is computed. This expected polychromatic x-ray spectrum can be computed as, $$\text{spectrum}(pr, i, j) = f(\text{spectrum}_{or}, WEP(pr, i, j), DQE); \quad (2)$$

where WEP(pr, i, j) denotes the water equivalent path computed for that specific line integral, spectrum or represents the original polychromatic x-ray spectrum as it exits the tube housing window, which is identical for all line integrals, and DQE stands for the detector quantum efficiency to the incident x-ray beam.

Second, the mass attenuation coefficient $\mu_m$(pr,i, j) for each line integral intersecting the metal object is computed based on the new x-ray spectrum. In instances where the elemental material for the metal object is not be available, a reference materials (e.g., titanium) can be used for the mass attenuation coefficient calculation.

Third, the metal object projections can be corrected to account for beam hardening by scaling each projection intersecting the metal based on the following ratio:

$$\mu_m(pr, i, j)/\mu_{m,avg}; \quad (3)$$

where $\mu_{m,avg}$ is the average mass attenuation coefficient of all line integrals intersecting the metal object.

This framework can be used to accurately simulate the presence of metal artifacts in CT images by artificially inserting the metal object in the projection domain. Compared to prior work on lesion insertion in CT projections, the developed framework explicitly accounts for distortions of the CT projection data introduced by the high attenuating metal objects.

As part of the developed framework, an intuitive graphical user interface can be generated and presented to a user in order to facilitate efficient insertion of any number different probes at arbitrary positions in patient CT data, to mimic both real and simulated patient procedures. With this tool, the user can select the type and number of ablation probe models, register them with any real probe from an existing procedure (if available), and determine desired locations and orientations of each probe in the CT volume.

Insertion of metal objects in the projection domain rather than in image domain is advantageous because it more accurately represents the impact of CT scan and reconstruction parameters on the appearance of the inserted objects. Moreover, metal object insertion in the projection domain generates the metal-induced artifacts that are the dominant factor influencing image quality in CT-guided procedures. The appearance of metal artifacts can be significantly affected by vendor-specific acquisition and reconstruction parameters used in the CT exam, which are typically proprietary. By inserting metal objects directly into the acquired CT projection data the combined projections can be reconstructed at the CT scanner console using the same algorithms as for later acquired clinical patient data. Advantageously, the developed framework is effectively vendor neutral and can be applied to any CT scanner geometry. Additionally, the insertion noise model used for metal object insertion directly and explicitly accounts for the effects of automatic exposure control, bowtie filter, and electronic noise, among others. Additionally or alternatively, artifact-corrupted images can also be produced by inserting virtual metal objects in the image domain rather than the projection domain.

The ability to accurately insert metallic ablation probes, or other metal objects, at arbitrarily locations within CT patient data with realistic artifact replication is advantageous for many clinical applications in interventional CT, and in CT imaging in general. For example, the metal object insertion can allow for performing virtual clinical trials within interventional oncology. One example of such trials can be to compare the effect of radiologist confidence in probe positioning and treatment planning when using different trajectories or different probe types. Another application can be to optimize CT data acquisition and reconstruction parameters for CT-guided ablation protocols. Additionally or alternatively, the metal object insertion tool described in the present disclosure can facilitate the development of novel, dedicated metal artifact reduction algorithms by allowing a reference library of patient data with and without metallic ablation probes to be built. As described in the present disclosure, such training data can be used to train a deep convolutional neural network to recognize and remove metal artifacts while maintaining the underlying patient anatomy.

In some embodiments, virtual metal objects can be inserted in the image domain rather than the projection domain. Inserting the virtual metal objects in the image domain has the advantage that access to projection data is not needed, which allows for keeping vendor specific artifact appearance in the images without needing access to raw projection data, which in some instances may require proprietary access.

Referring now to FIG. SA, an example framework for inserting virtual metal objects into CT image data (e.g., images) is shown. An example workflow of this process is also shown in FIG. SB.

The method includes accessing background image data containing images that depict uniform backgrounds, as indicated at step 502. Accessing the background image data may include retrieving such data from a memory or other suitable data storage device or medium. Alternatively, accessing the background image data may include acquiring such data with a CT imaging system and transferring or otherwise communicating the data to the computer system, which may be a part of the CT imaging system. In general, the background image data includes CT images that depict uniform backgrounds both with and without metal objects.

For instance, the background image data can be acquired from a phantom or other object with material or media that can provide a relatively uniform image. As a non-limiting example, a container filled with air or another suitable medium with little x-ray attenuation can be used as the object for imaging. A first CT scan of the container is performed without any probes. Subsequently, an arbitrary number of metallic probes is inserted through the lid (e.g., a Styrofoam lid) and into the container at arbitrary orientations. Following, the container can be filled with water or another material or medium that attenuates x-rays (e.g., a material or medium with x-ray attenuation properties similar to soft tissue, or the like). A third CT scan can then performed, after which the metallic probes are removed and a fourth CT scan is performed of the filled container without metallic probes.

Thus, in general, the background image data can include four sets of images: first background image data containing images that depict a uniform background with little to no x-ray attenuation, to which no metallic objects have been inserted; second background image data containing images that depict a uniform background with little to no x-ray attenuation, to which one or more metallic objects has been inserted; third background image data containing images that depict a uniform background with x-ray attenuation comparable to soft tissues, to which no metallic objects have been inserted; and fourth background image data containing images that depict a uniform background with x-ray attenuation comparable to soft tissues, to which one or more metallic objects has been inserted. The third and fourth background image data can include images reconstructed with the same reconstruction parameters that will be used in clinical imaging studies, or different sets of third and fourth background image data can be reconstructed with different sets of such parameters (e.g., kernel, slice thickness).

Masks of the metal objects depicted in the background image data are generated and stored on a computer system, as indicated at step 504. Metal object masks with and without metal-induced artifacts are generated. As a non-limiting example, high resolution CT images in the background image data with and without the metallic probe(s) inserted can subtracted to generate the metal object mask. For instance, a first metal object mask can be generated by subtracting the first and second background image data (i.e., the images with a uniform background material with little to no x-ray attenuation). This first mask metallic object mask will be substantially artifact-free due to the lack of attenuating material surrounding the metallic objects. Metal object segmentation can further eliminate any residual artifacts. A second metal object mask can be generated by subtracting the third and fourth background image data (i.e., the images with a uniform background material having x-ray attenuation comparable to soft tissues, or the like). This metal object mask will contain similar metal artifact to what would be encountered is the same number and orientation of metallic probes were present in a patient CT scan. Multiple masks can be generated from one acquisition for different reconstruction parameters.

Subject image data containing CT images depicting the anatomy of subjects are also accessed with the computer system, as indicated at step 506. Like the background image data, accessing the subject image data may include retrieving such data from a memory or other suitable data storage device or medium. Alternatively, accessing the subject image data may include acquiring such data with a CT imaging system and transferring or otherwise communicating the data to the computer system, which may be a part of the CT imaging system.

The metal object masks are superimposed to the anatomy of the subject to generate realistic representations of where the image depicts anatomy of the subject, the metal objects, and artifacts corresponding to the metal objects, as indicated at step 508. For instance, the first and second metal object masks can be added to subject image data in order to generate a set of matching data differing only for the presence of metal-induced artifact. The resulting masked subject data can be used as training data for the neural networks or other machine learning algorithms or models described in the present disclosure as a standalone method or in conjunction with the projection-based approach described elsewhere in the present disclosure.

Figure 6:
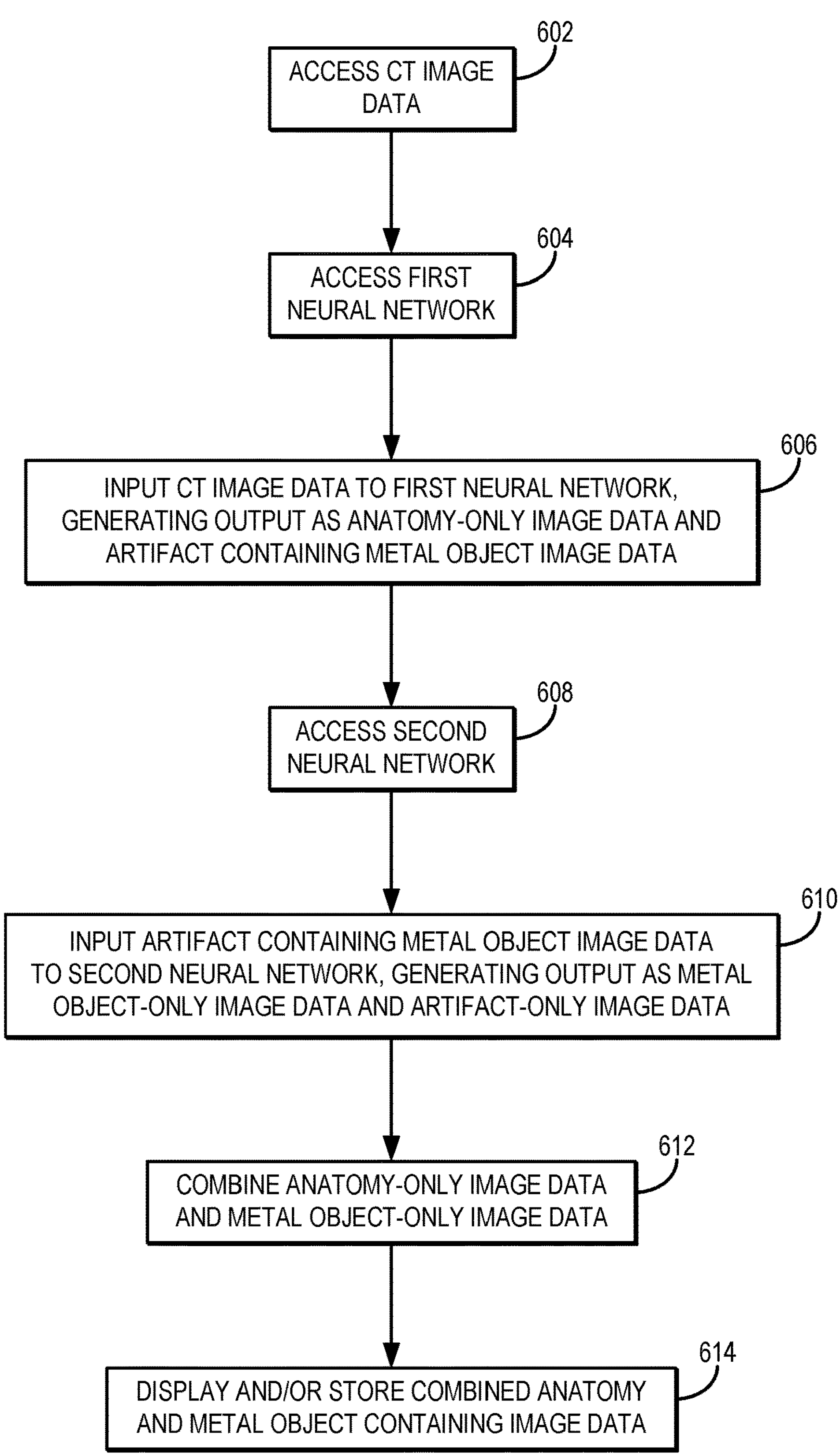
FIG. 6 is a flowchart setting forth the steps of an example method for reducing metal artifacts in an image obtained with a computed tomography ("CT") imaging system using a dual model technique.

As described above, in some embodiments a dual model approach can be implemented, in which a first neural network, or other machine learning algorithm, is used to generate anatomy-only image data and artifact-containing metal object image data, and then a second neural network, or other machine learning algorithm, is used to process the artifact-containing metal object image data output from the first neural network to generate metal object-only image data and artifact-only image data. Referring now to FIG. 6, a flowchart is illustrated as setting forth the steps of an example of such a method for reducing metal artifacts in x-ray CT images.

The method includes accessing CT image data with a computer system, as indicated at step 602. Accessing the CT image data may include retrieving such data from a memory or other suitable data storage device or medium. Alternatively, accessing the CT image data may include acquiring such data with a CT imaging system and transferring or otherwise communicating the data to the computer system, which may be a part of the CT imaging system.

In general, the CT image data contain images of a subject that have been acquired with a CT imaging system. In addition to depicting the subject's anatomy, the images also depict the presence of metal objects and the corresponding metal object artifacts. As one non-limiting example, the metal object depicted in the images can be an interventional probe (e.g., an ablation probe). In these instances, the method will remove the artifacts generated by the presence of the metal object, while retaining the visualization of the metal object within the images.

A first trained neural network (or other suitable machine learning algorithm) is then accessed with the computer system, as indicated at step 604. Accessing the first trained neural network may include accessing network parameters (e.g., weights, biases, or both) that have been optimized or otherwise estimated by training the neural network on training data. In some instances, accessing the first neural network can also include retrieving, constructing, or otherwise accessing the particular neural network architecture to be implemented. For instance, data pertaining to the layers in the neural network architecture (e.g., number of layers, type of layers, ordering of layers, connections between layers, hyperparameters for layers) may be retrieved, selected, constructed, or otherwise accessed.

In general, the first neural network is trained, or has been trained, on training data in order to separate anatomy from metal objects and the corresponding metal object artifacts.

As such, the output data generated by the first neural network includes anatomy-only images and metal object images with artifacts.

The CT image data are then input to the first trained neural network, generating output as anatomy-only image data and artifact containing metal object image data, as indicated at step 606. For example, the anatomy-only image data may include CT images that depict substantially only the subject's anatomy (i.e., with the metal object and corresponding artifacts removed or otherwise significantly reduced). Likewise, the artifact containing metal object image data may include CT images that depict substantially only the metal object(s) in the subject and the corresponding artifacts generated by the metal object(s).

A second trained neural network (or other suitable machine learning algorithm) is also accessed with the computer system, as indicated at step 608. Accessing the second trained neural network may include accessing network parameters (e.g., weights, biases, or both) that have been optimized or otherwise estimated by training the neural network on training data. In some instances, accessing the second neural network can also include retrieving, constructing, or otherwise accessing the particular neural network architecture to be implemented. For instance, data pertaining to the layers in the neural network architecture (e.g., number of layers, type of layers, ordering of layers, connections between layers, hyperparameters for layers) may be retrieved, selected, constructed, or otherwise accessed.

In general, the second neural network is trained, or has been trained, on training data in order to separate metal objects from the corresponding artifacts generated by the metal objects. As such, the output data generated by the second neural network includes metal object-only images and artifact-only images.

The artifact containing metal object image data output from the first neural network are then input to the second trained neural network, generating output as metal object-only image data and artifact-only image data, as indicated at step 610. For example, the metal object-only image data may include CT images that depict substantially only the metal object(s) present in the subject, and the artifact-only image data may include CT images that depict substantially only the artifacts generated by the metal object(s) in the subject.

Alternatively, the metal object-only image data and artifact-only image data can be generated using other segmentation techniques to separate the contributions of the metal object(s) from those of the artifacts in the artifact containing metal object image data output from the first neural network. Such segmentation techniques can include manual segmentation and/or other automated or semi-automated segmentation techniques.

The anatomy-only image data output from the first neural network and the metal object-only image data output from the second neural network are then combined to generated anatomy and metal object containing image data, as indicated at step 612. Advantageously, the anatomy and metal object containing image data may include CT images that depict both the subject's anatomy and the presence of any metal objects within the subject. Within the context of interventional oncology, or other CT-guided interventional procedures, these images are advantageous because they enable the user to visualize the location and orientation of a metallic probe or other interventional instrument relative to the subject's anatomy. This allows for reliable visualization and positioning of interventional instruments during a procedure, without the deleterious effects of artifacts created by the presence of the metal object(s) in the subject.

The anatomy and metal object containing image data generated by combining the anatomy-only image data and the metal object-only image data can then displayed to a user, stored for later use or further processing, or both, as indicated at step 614. For instance, the anatomy and metal object containing image data can be displayed to a user during an interventional procedure in order to provide for visualization and guidance of a metallic interventional instrument during a procedure.

Figures 7, 8:
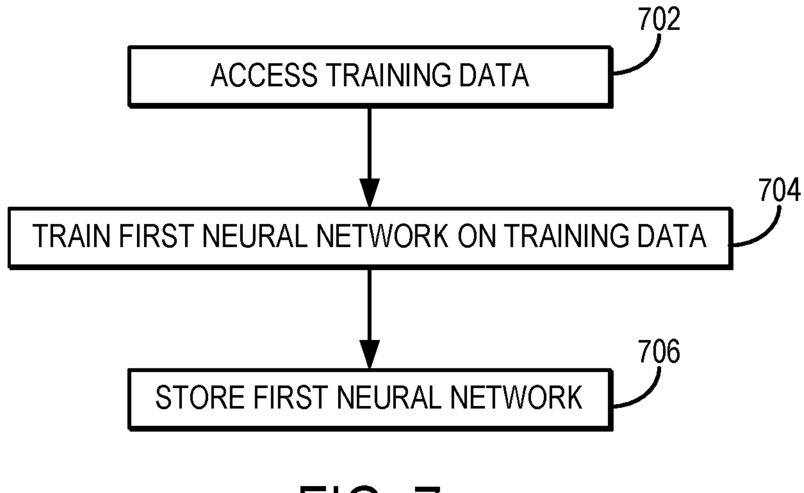
FIG. 7 is a flowchart setting forth the steps of an example method for training a neural network to separate anatomy depicted in a CT image from a metal object and artifacts corresponding to the metal object that are present in the CT image.
FIG. 8 is a flowchart setting forth the steps of an example method for training a neural network to separate a metal object from artifacts corresponding to the metal object in a CT image.

Referring now to FIG. 7, a flowchart is illustrated as setting forth the steps of an example method for training one or more neural networks (or other suitable machine learning algorithms) on training data, such that the one or more neural networks are trained to receive input as metal artifact-corrupted CT images in order to generate output as anatomy-only images and artifact-corrupted images depicting metal objects depicted in the input images.

In general, the neural network(s) can implement any number of different neural network architectures. For instance, the neural network(s) could implement a convolutional neural network, a residual neural network, and so on. In some instances, the neural network(s) may implement deep learning. Alternatively, the neural network(s) could be replaced with other suitable machine learning algorithms, such as those based on supervised learning, unsupervised learning, ensemble learning, and so on.

The method includes accessing training data with a computer system, as indicated at step 702. Accessing the training data may include retrieving such data from a memory or other suitable data storage device or medium. Alternatively, accessing the training data may include acquiring such data with a CT imaging system and transferring or otherwise communicating the data to the computer system, which may be a part of the CT imaging system.

In general, the training data can include pre-procedural images of the subject, and copies of the pre-procedural images to which one or more virtual metal objects has been inserted. An example method for inserting virtual metal objects to CT images is described below in more detail.

In some embodiments, the training data can include cloned data generated using data augmentation. As an example, the cloned data can be generated by making copies of the images in the training data while altering or modifying each copy of the images. For instance, cloned data can be generated using data augmentation techniques, such as adding noise to the original images, performing a deformable transformation (e.g., translation, rotation, both) on the original images, smoothing the original images, applying a random geometric perturbation to the original images, combinations thereof, and so on.

A neural network (or other suitable machine learning algorithm) is then trained on the training data, as indicated at step 704. In general, the neural network can be trained by optimizing network parameters (e.g., weights, biases, or both) based on minimizing a loss function. As one non-limiting example, the loss function may be a mean squared error loss function.

Training a neural network may include initializing the neural network, such as by computing, estimating, or otherwise selecting initial network parameters (e.g., weights, biases, or both). Training data can then be input to the initialized neural network, generating output as anatomy-only images and artifact containing metal object images. The quality of the output images can then be evaluated, such as by passing the output images to the loss function to compute an error. The current neural network can then be updated based on the calculated error (e.g., using backpropagation methods based on the calculated error). For instance, the current neural network can be updated by updating the network parameters (e.g., weights, biases, or both) in order to minimize the loss according to the loss function. When the error has been minimized (e.g., by determining whether an error threshold or other stopping criterion has been satisfied), the current neural network and its associated network parameters represent the trained neural network.

The trained neural network is then stored for later use, as indicated at step 706. Storing the neural network may include storing network parameters (e.g., weights, biases, or both), which have been computed or otherwise estimated by training the neural network on the training data. Storing the trained neural network may also include storing the particular neural network architecture to be implemented. For instance, data pertaining to the layers in the neural network architecture (e.g., number of layers, type of layers, ordering of layers, connections between layers, hyperparameters for layers) may be stored.

Referring now to FIG. 8, a flowchart is illustrated as setting forth the steps of an example method for training one or more neural networks (or other suitable machine learning algorithms) on training data, such that the one or more neural networks are trained to receive input as artifact containing metal object images in order to generate output as artifact-only images and metal object-only images, in which artifacts attributable from the metal object(s) have been removed.

In general, the neural network(s) can implement any number of different neural network architectures. For instance, the neural network(s) could implement a convolutional neural network, a residual neural network, and so on. In some instances, the neural network(s) may implement deep learning. Alternatively, the neural network(s) could be replaced with other suitable machine learning algorithms, such as those based on supervised learning, unsupervised learning, ensemble learning, and so on.

The method includes accessing training data with a computer system, as indicated at step 802. Accessing the training data may include retrieving such data from a memory or other suitable data storage device or medium. Alternatively, accessing the training data may include acquiring such data with a CT imaging system and transferring or otherwise communicating the data to the computer system, which may be a part of the CT imaging system.

In general, the training data can include phantom images (preferably acquired using the same CT imaging system that is used to acquire images of the subject) that depict an imaging phantom and one or more metal objects within the phantom. Preferably, the metal objects present in the phantom are similar to the metal objects expected to be encountered when imaging the subject (e.g., the type of interventional instrument to be used during an intervention procedure on the subject).

In some embodiments, the training data can include cloned data generated from the phantom images. As an example, the cloned data can be generated by making copies of the phantom images while altering or modifying each copy of the phantom images. For instance, cloned data can be generated using data augmentation techniques, such as adding noise to the original phantom images, performing a deformable transformation (e.g., translation, rotation, both) on the original phantom images, smoothing the original phantom images, applying a random geometric perturbation to the original phantom images, combinations thereof, and so on.

The training data may include segmented images and/or segmentation masks associated with the metal objects depicted in the phantom images. Additionally or alternatively, the method can include generating segmented images and/or image masks from the phantom images contained in the training data and storing the segmented images and/or image masks as part of the training data. The segmented images and/or image masks can be generated by manually segmenting the phantom images, or by using an automated segmentation technique.

Additionally or alternatively, the method can include assembling training data from the phantom images using a computer system. This step may include assembling the phantom images into an appropriate data structure on which the machine learning algorithm can be trained. Assembling the training data may include assembling phantom images, segmented images, image masks, and other relevant data. For instance, assembling the training data may include generating labeled data and including the labeled data in the training data. Labeled data may include phantom images, segmented images, image masks, or other relevant data that have been labeled as belonging to, or otherwise being associated with, one or more different classifications or categories. For instance, labeled data may include phantom images and/or segmented images that have been labeled based on the segmentation of the phantom images. The labeled data may include labeling all data within a field-of-view of the phantom images and/or segmented images, or may include labeling only those data in one or more regions-of-interest within the phantom images and/or segmented images. The labeled data may include data that are classified on a voxel-by-voxel basis, or a regional or larger volume basis.

A second neural network (or other suitable machine learning algorithm) is then trained on the training data, as indicated at step 804. In general, the neural network can be trained by optimizing network parameters (e.g., weights, biases, or both) based on minimizing a loss function. As one non-limiting example, the loss function may be a mean squared error loss function.

Training a neural network may include initializing the neural network, such as by computing, estimating, or otherwise selecting initial network parameters (e.g., weights, biases, or both). Training data can then be input to the initialized neural network, generating output as artifact-only images and metal object-only images. The quality of the output images can then be evaluated, such as by passing the output images to the loss function to compute an error. The current neural network can then be updated based on the calculated error (e.g., using backpropagation methods based on the calculated error). For instance, the current neural network can be updated by updating the network parameters (e.g., weights, biases, or both) in order to minimize the loss according to the loss function. When the error has been minimized (e.g., by determining whether an error threshold or other stopping criterion has been satisfied), the current neural network and its associated network parameters represent the trained neural network.

The second trained neural network is then stored for later use, as indicated at step 806. Storing the neural network may include storing network parameters (e.g., weights, biases, or both), which have been computed or otherwise estimated by training the neural network on the training data. Storing the trained neural network may also include storing the particular neural network architecture to be implemented. For instance, data pertaining to the layers in the neural network architecture (e.g., number of layers, type of layers, ordering of layers, connections between layers, hyperparameters for layers) may be stored.

Figure 9:
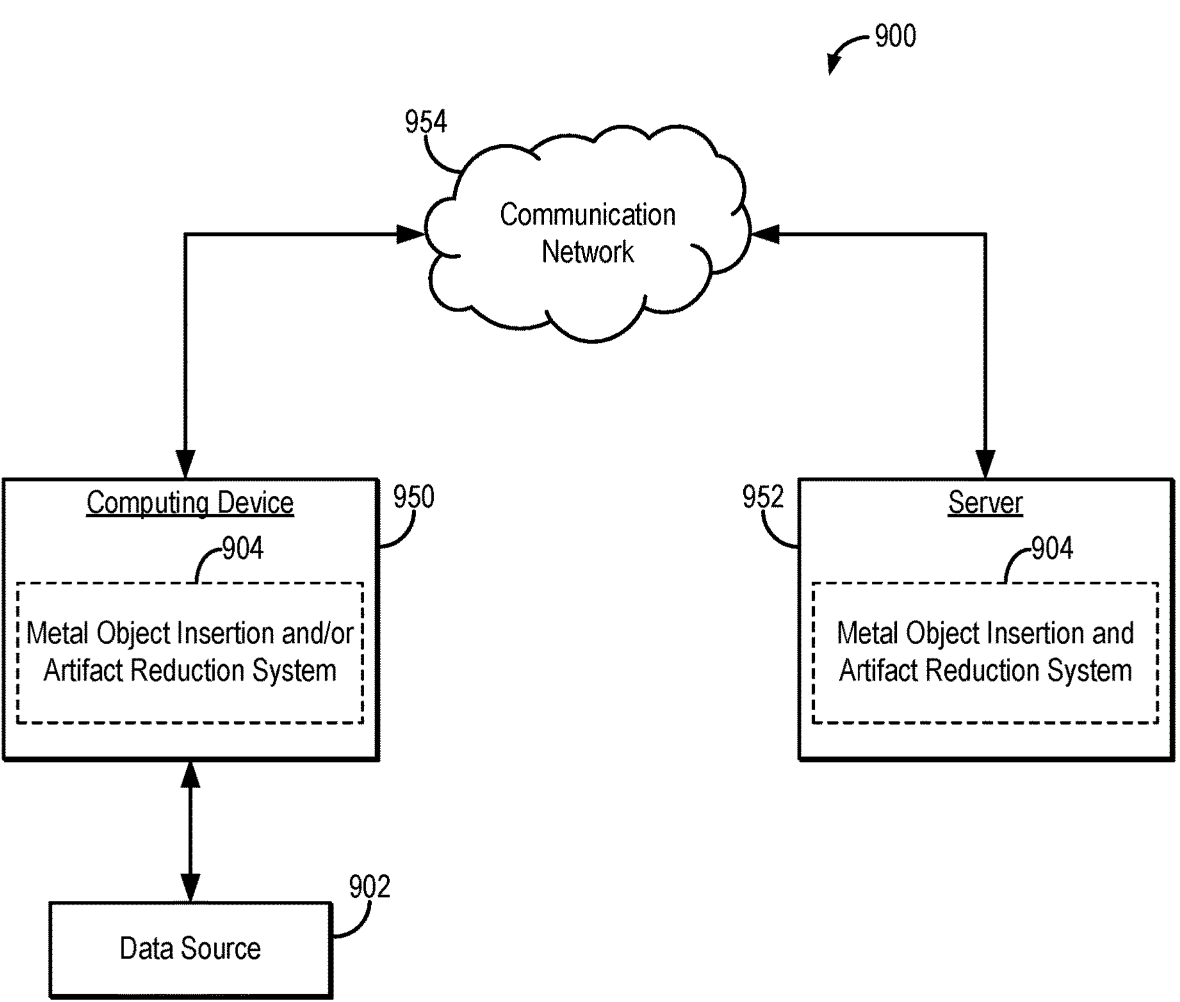
FIG. 9 is a block diagram of an example system for inserting a virtual metal object and/or reducing metal artifacts in CT images.

Referring now to FIG. 9, an example of a system 900 for metal object insertion and/or artifact reduction in accordance with some embodiments of the systems and methods described in the present disclosure is shown. As shown in FIG. 9, a computing device 950 can receive one or more types of data (e.g., CT projection data, CT image data, training data) from data source 902, which may be a CT projection data source, a CT image source, or so on. In some embodiments, computing device 950 can execute at least a portion of a metal object insertion and/or artifact reduction system 904 to insertion virtual metal objects into CT projection data and/or reduce metal artifacts in CT images from data received from the data source 902.

Additionally or alternatively, in some embodiments, the computing device 950 can communicate information about data received from the data source 902 to a server 952 over a communication network 954, which can execute at least a portion of the metal object insertion and/or artifact reduction system 904. In such embodiments, the server 952 can return information to the computing device 950 (and/or any other suitable computing device) indicative of an output of the metal object insertion and/or artifact reduction system 904.

In some embodiments, computing device 950 and/or server 952 can be any suitable computing device or combination of devices, such as a desktop computer, a laptop computer, a smartphone, a tablet computer, a wearable computer, a server computer, a virtual machine being executed by a physical computing device, and so on. The computing device 950 and/or server 952 can also reconstruct images from the data.

In some embodiments, data source 902 can be any suitable source of CT projection and/or image data (e.g., raw projection data, images reconstructed from raw projection data), such as a CT imaging system, another computing device (e.g., a server storing image data), and so on. In some embodiments, data source 902 can be local to computing device 950. For example, data source 902 can be incorporated with computing device 950 (e.g., computing device 950 can be configured as part of a device for capturing, scanning, and/or storing images). As another example, data source 902 can be connected to computing device 950 by a cable, a direct wireless link, and so on. Additionally or alternatively, in some embodiments, data source 902 can be located locally and/or remotely from computing device 950, and can communicate data to computing device 950 (and/or server 952) via a communication network (e.g., communication network 954).

In some embodiments, communication network 954 can be any suitable communication network or combination of communication networks. For example, communication network 954 can include a Wi-Fi network (which can include one or more wireless routers, one or more switches, etc.), a peer-to-peer network (e.g., a Bluetooth network), a cellular network (e.g., a 3G network, a 4G network, etc., complying with any suitable standard, such as CDMA, GSM, LTE, LTE Advanced, WiMAX, etc.), a wired network, and so on. In some embodiments, communication network 954 can be a local area network, a wide area network, a public network (e.g., the Internet), a private or semi-private network (e.g., a corporate or university intranet), any other suitable type of network, or any suitable combination of networks. Communications links shown in FIG. 9 can each be any suitable communications link or combination of communications links, such as wired links, fiber optic links, Wi-Fi links, Bluetooth links, cellular links, and so on.

Figure 10:
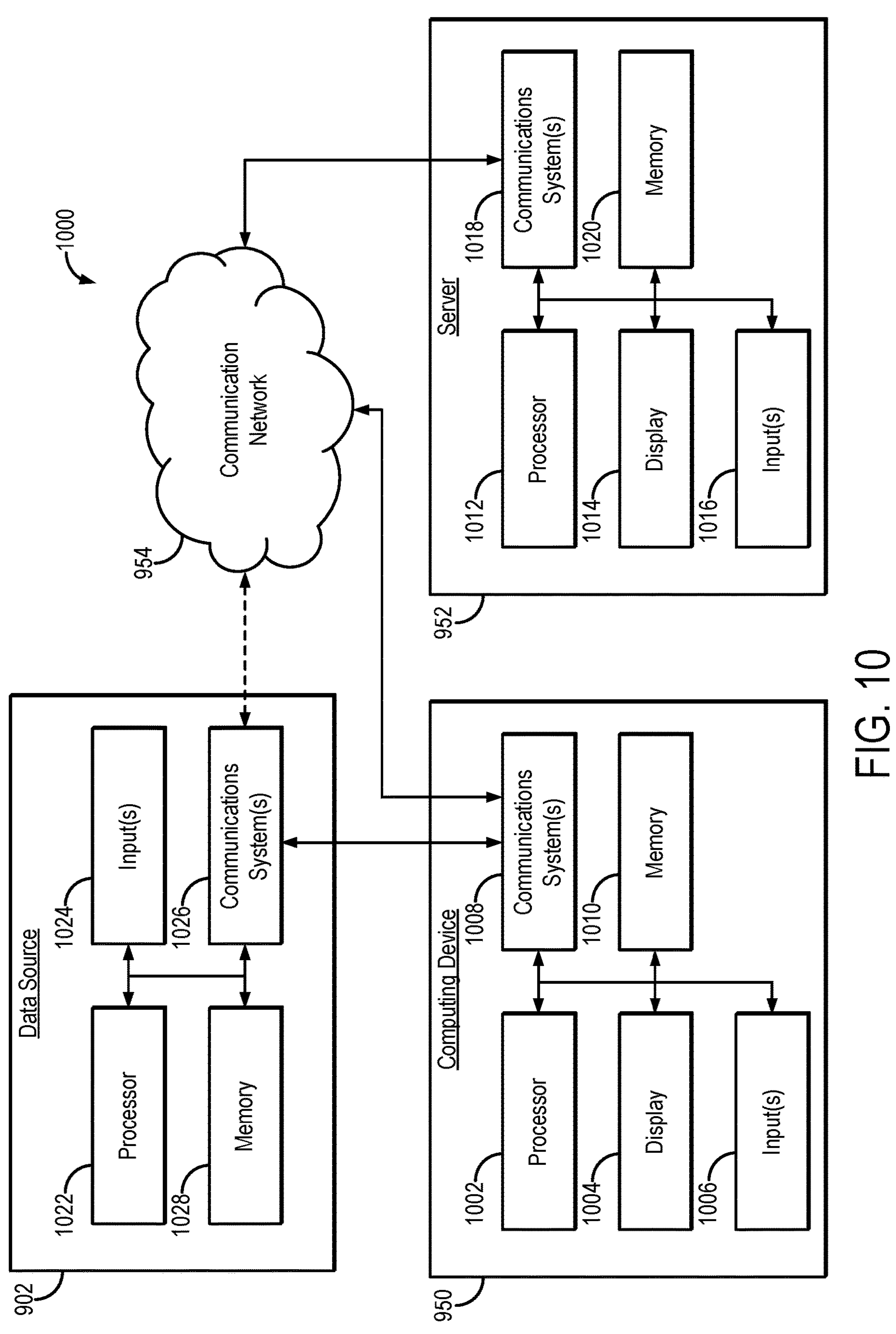
FIG. 10 is a block diagram of example components that can implement the system of FIG. 9.

Referring now to FIG. 10, an example of hardware 1000 that can be used to implement data source 902, computing device 950, and server 952 in accordance with some embodiments of the systems and methods described in the present disclosure is shown. As shown in FIG. 10, in some embodiments, computing device 950 can include a processor 1002, a display 1004, one or more inputs 1006, one or more communication systems 1008, and/or memory 1010. In some embodiments, processor 1002 can be any suitable hardware processor or combination of processors, such as a central processing unit ("CPU"), a graphics processing unit ("GPU"), and so on. In some embodiments, display 1004 can include any suitable display devices, such as a computer monitor, a touchscreen, a television, and so on. In some embodiments, inputs 1006 can include any suitable input devices and/or sensors that can be used to receive user input, such as a keyboard, a mouse, a touchscreen, a microphone, and so on.

In some embodiments, communications systems 1008 can include any suitable hardware, firmware, and/or software for communicating information over communication network 954 and/or any other suitable communication networks. For example, communications systems 1008 can include one or more transceivers, one or more communication chips and/or chip sets, and so on. In a more particular example, communications systems 1008 can include hardware, firmware and/or software that can be used to establish a Wi-Fi connection, a Bluetooth connection, a cellular connection, an Ethernet connection, and so on.

In some embodiments, memory 1010 can include any suitable storage device or devices that can be used to store instructions, values, data, or the like, that can be used, for example, by processor 1002 to present content using display 1004, to communicate with server 952 via communications system(s) 1008, and so on. Memory 1010 can include any suitable volatile memory, non-volatile memory, storage, or any suitable combination thereof. For example, memory 1010 can include RAM, ROM, EEPROM, one or more flash drives, one or more hard disks, one or more solid state drives, one or more optical drives, and so on. In some embodiments, memory 1010 can have encoded thereon, or otherwise stored therein, a computer program for controlling operation of computing device 950. In such embodiments, processor 1002 can execute at least a portion of the computer program to present content (e.g., images, user interfaces, graphics, tables), receive content from server 952, transmit information to server 952, and so on.

In some embodiments, server 952 can include a processor 1012, a display 1014, one or more inputs 1016, one or more communications systems 1018, and/or memory 1020. In some embodiments, processor 1012 can be any suitable hardware processor or combination of processors, such as a CPU, a GPU, and so on. In some embodiments, display 1014 can include any suitable display devices, such as a computer monitor, a touchscreen, a television, and so on. In some embodiments, inputs 1016 can include any suitable input devices and/or sensors that can be used to receive user input, such as a keyboard, a mouse, a touchscreen, a microphone, and so on.

In some embodiments, communications systems 1018 can include any suitable hardware, firmware, and/or software for communicating information over communication network 954 and/or any other suitable communication networks. For example, communications systems 1018 can include one or more transceivers, one or more communication chips and/or chip sets, and so on. In a more particular example, communications systems 1018 can include hardware, firmware and/or software that can be used to establish a Wi-Fi connection, a Bluetooth connection, a cellular connection, an Ethernet connection, and so on.

In some embodiments, memory 1020 can include any suitable storage device or devices that can be used to store instructions, values, data, or the like, that can be used, for example, by processor 1012 to present content using display 1014, to communicate with one or more computing devices 950, and so on. Memory 1020 can include any suitable volatile memory, non-volatile memory, storage, or any suitable combination thereof. For example, memory 1020 can include RAM, ROM, EEPROM, one or more flash drives, one or more hard disks, one or more solid state drives, one or more optical drives, and so on. In some embodiments, memory 1020 can have encoded thereon a server program for controlling operation of server 952. In such embodiments, processor 1012 can execute at least a portion of the server program to transmit information and/or content (e.g., data, images, a user interface) to one or more computing devices 950, receive information and/or content from one or more computing devices 950, receive instructions from one or more devices (e.g., a personal computer, a laptop computer, a tablet computer, a smartphone), and so on.

In some embodiments, data source 902 can include a processor 1022, one or more inputs 1024, one or more communications systems 1026, and/or memory 1028. In some embodiments, processor 1022 can be any suitable hardware processor or combination of processors, such as a CPU, a GPU, and so on. In some embodiments, the one or more inputs 1024 are generally configured to acquire data, images, or both, and can include a CT imaging system. Additionally or alternatively, in some embodiments, one or more inputs 1024 can include any suitable hardware, firmware, and/or software for coupling to and/or controlling operations of a CT imaging system. In some embodiments, one or more portions of the one or more inputs 1024 can be removable and/or replaceable.

Note that, although not shown, data source 902 can include any suitable inputs and/or outputs. For example, data source 902 can include input devices and/or sensors that can be used to receive user input, such as a keyboard, a mouse, a touchscreen, a microphone, a trackpad, a trackball, and so on. As another example, data source 902 can include any suitable display devices, such as a computer monitor, a touchscreen, a television, etc., one or more speakers, and so on.

In some embodiments, communications systems 1026 can include any suitable hardware, firmware, and/or software for communicating information to computing device 950 (and, in some embodiments, over communication network 954 and/or any other suitable communication networks). For example, communications systems 1026 can include one or more transceivers, one or more communication chips and/or chip sets, and so on. In a more particular example, communications systems 1026 can include hardware, firmware and/or software that can be used to establish a wired connection using any suitable port and/or communication standard (e.g., VGA, DVI video, USB, RS-232, etc.), Wi-Fi connection, a Bluetooth connection, a cellular connection, an Ethernet connection, and so on.

In some embodiments, memory 1028 can include any suitable storage device or devices that can be used to store instructions, values, data, or the like, that can be used, for example, by processor 1022 to control the one or more inputs 1024, and/or receive data from the one or more inputs 1024; to images from data; present content (e.g., images, a user interface) using a display; communicate with one or more computing devices 950; and so on. Memory 1028 can include any suitable volatile memory, non-volatile memory, storage, or any suitable combination thereof. For example, memory 1028 can include RAM, ROM, EEPROM, one or more flash drives, one or more hard disks, one or more solid state drives, one or more optical drives, and so on. In some embodiments, memory 1028 can have encoded thereon, or otherwise stored therein, a program for controlling operation of data source 902. In such embodiments, processor 1022 can execute at least a portion of the program to generate images, transmit information and/or content (e.g., data, images) to one or more computing devices 950, receive information and/or content from one or more computing devices 950, receive instructions from one or more devices (e.g., a personal computer, a laptop computer, a tablet computer, a smartphone, etc.), and so on.

In some embodiments, any suitable computer readable media can be used for storing instructions for performing the functions and/or processes described herein. For example, in some embodiments, computer readable media can be transitory or non-transitory. For example, non-transitory computer readable media can include media such as magnetic media (e.g., hard disks, floppy disks), optical media (e.g., compact discs, digital video discs, Blu-ray discs), semiconductor media (e.g., random access memory ("RAM"), flash memory, electrically programmable read only memory ("EPROM"), electrically erasable programmable read only memory ("EEPROM")), any suitable media that is not fleeting or devoid of any semblance of permanence during transmission, and/or any suitable tangible media. As another example, transitory computer readable media can include signals on networks, in wires, conductors, optical fibers, circuits, or any suitable media that is fleeting and devoid of any semblance of permanence during transmission, and/or any suitable intangible media.

Figure 11A:
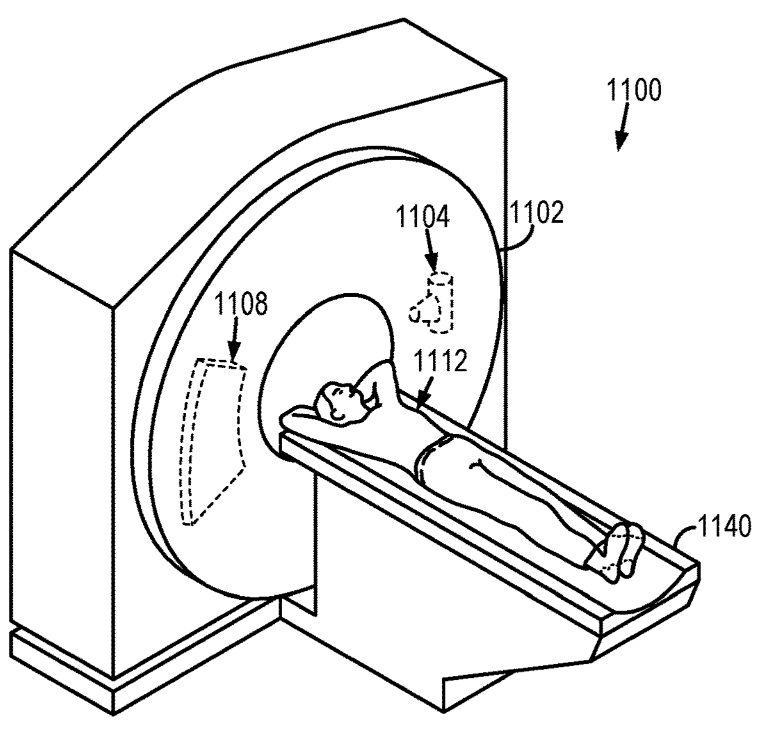
FIGS. 11A and 11B illustrate an example CT imaging system that can implement some embodiments described in the present disclosure.
Figure 11B:
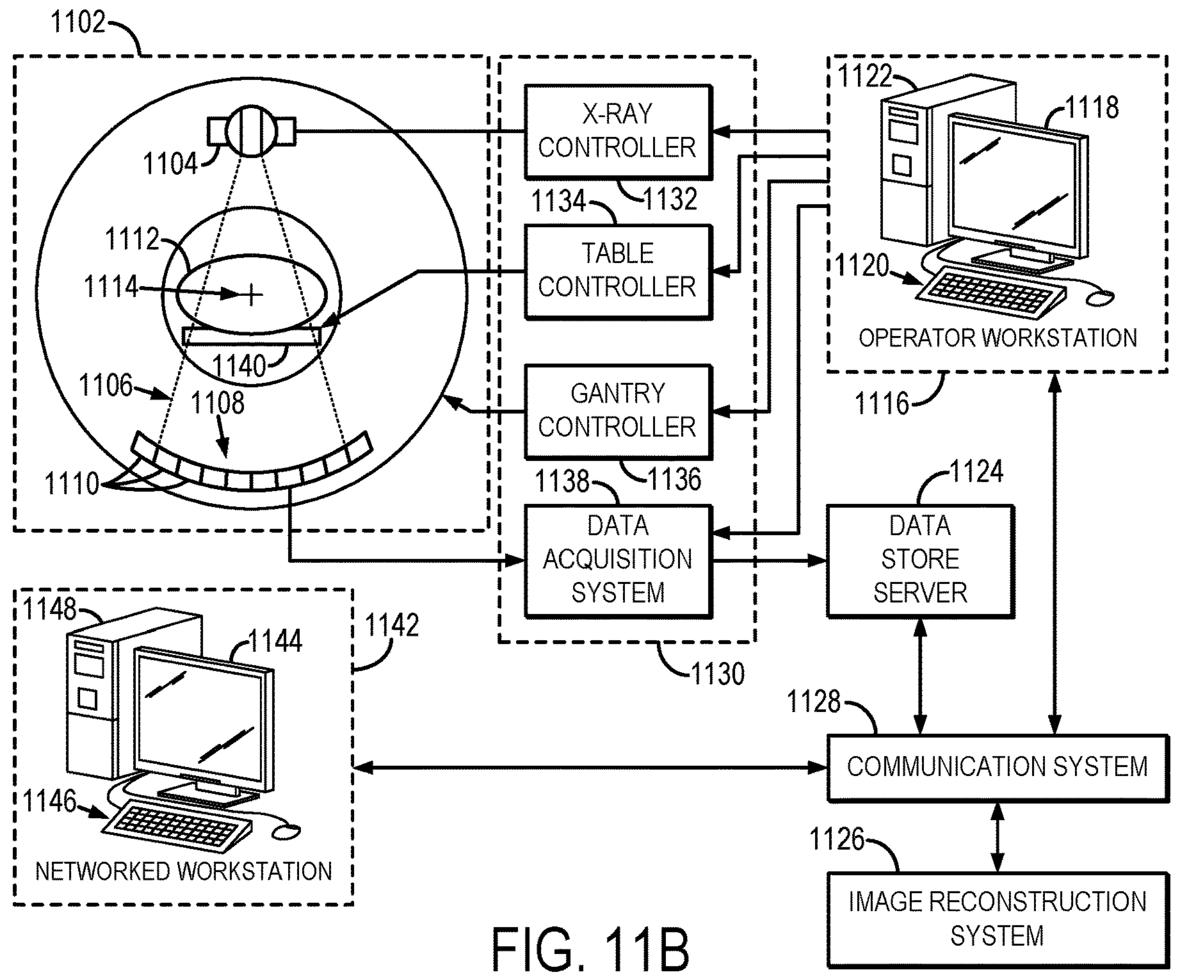

Referring particularly now to FIGS. 11A and 11B, an example of an x-ray computed tomography ("CT") imaging system 1100 is illustrated. The CT system includes a gantry 1102, to which at least one x-ray source 1104 is coupled. The x-ray source 1104 projects an x-ray beam 1106, which may be a fan-beam or cone-beam of x-rays, towards a detector array 1108 on the opposite side of the gantry 1102. The detector array 1108 includes a number of x-ray detector elements 1110. Together, the x-ray detector elements 1110 sense the projected x-rays 1106 that pass through a subject 1112, such as a medical patient or an object undergoing examination, that is positioned in the CT system 1100. Each x-ray detector element 1110 produces an electrical signal that may represent the intensity of an impinging x-ray beam and, hence, the attenuation of the beam as it passes through the subject 1112. In some configurations, each x-ray detector 1110 is capable of counting the number of x-ray photons that impinge upon the detector 1110. During a scan to acquire x-ray projection data, the gantry 1102 and the components mounted thereon rotate about a center of rotation 1114 located within the CT system 1100.

The CT system 1100 also includes an operator workstation 1116, which typically includes a display 1118; one or more input devices 1120, such as a keyboard and mouse; and a computer processor 1122. The computer processor 1122 may include a commercially available programmable machine running a commercially available operating system. The operator workstation 1116 provides the operator interface that enables scanning control parameters to be entered into the CT system 1100. In general, the operator workstation 1116 is in communication with a data store server 1124 and an image reconstruction system 1126. By way of example, the operator workstation 1116, data store sever 1124, and image reconstruction system 1126 may be connected via a communication system 1128, which may include any suitable network connection, whether wired, wireless, or a combination of both. As an example, the communication system 1128 may include both proprietary or dedicated networks, as well as open networks, such as the internet.

The operator workstation 1116 is also in communication with a control system 1130 that controls operation of the CT system 1100. The control system 1130 generally includes an x-ray controller 1132, a table controller 1134, a gantry controller 1136, and a data acquisition system 1138. The x-ray controller 1132 provides power and timing signals to the x-ray source 1104 and the gantry controller 1136 controls the rotational speed and position of the gantry 1102. The table controller 1134 controls a table 1140 to position the subject 1112 in the gantry 1102 of the CT system 1100.

The DAS 1138 samples data from the detector elements 1110 and converts the data to digital signals for subsequent processing. For instance, digitized x-ray data is communicated from the DAS 1138 to the data store server 1124. The image reconstruction system 1126 then retrieves the x-ray data from the data store server 1124 and reconstructs an image therefrom. The image reconstruction system 1126 may include a commercially available computer processor, or may be a highly parallel computer architecture, such as a system that includes multiple-core processors and massively parallel, high-density computing devices. Optionally, image reconstruction can also be performed on the processor 1122 in the operator workstation 1116. Reconstructed images can then be communicated back to the data store server 1124 for storage or to the operator workstation 1116 to be displayed to the operator or clinician.

The CT system 1100 may also include one or more networked workstations 1142. By way of example, a networked workstation 1142 may include a display 1144; one or more input devices 1146, such as a keyboard and mouse; and a processor 1148. The networked workstation 1142 may be located within the same facility as the operator workstation 1116, or in a different facility, such as a different healthcare institution or clinic.

The networked workstation 1142, whether within the same facility or in a different facility as the operator workstation 1116, may gain remote access to the data store server 1124 and/or the image reconstruction system 1126 via the communication system 1128. Accordingly, multiple networked workstations 1142 may have access to the data store server 1124 and/or image reconstruction system 1126. In this manner, x-ray data, reconstructed images, or other data may be exchanged between the data store server 1124, the image reconstruction system 1126, and the networked workstations 1142, such that the data or images may be remotely processed by a networked workstation 1142. This data may be exchanged in any suitable format, such as in accordance with the transmission control protocol ("TCP"), the internet protocol ("IP"), or other known or suitable protocols.

The present disclosure has described one or more preferred embodiments, and it should be appreciated that many equivalents, alternatives, variations, and modifications, aside from those expressly stated, are possible and within the scope of the invention.

The invention claimed is:

1. A method for generating a metal artifact reduced image, the method comprising:

(a) accessing computed tomography (CT) image data with a computer system, the CT image data being acquired from a subject using a CT imaging system and depicting anatomy of the subject, a metal object present in the subject, and artifacts caused by the metal object;

(b) accessing a trained neural network with the computer system, the trained neural network being trained on training data in order to separate anatomy and metal objects from artifacts caused by metal objects, wherein the neural network is trained on training data comprising artifact-corrupted image data comprising CT images to which virtual metal object data have been inserted in a projection domain, and artifact-uncorrupted image data comprising the CT images to which the virtual metal object data have been inserted in an image domain; and (c) inputting the CT image data to the trained neural network, generating output as artifact-reduced image data depicting the anatomy of the subject and the metal object, wherein the artifacts caused by the metal object are reduced.

2. The method of claim 1, wherein the neural network is a convolutional neural network.

3. The method of claim 1, wherein the CT images are pre-procedural CT images acquired from the subject when the metal object is not present in the subject, wherein the pre-procedural CT images do not depict the metal object.

4. The method of claim 1, wherein the artifact-corrupted image data are generated by inserting the virtual metal object data to the pre-procedural CT images in the projection domain by:

forward projecting a virtual model of a reference metal object to generate virtual metal object projection data;

generating combined projection data by combining CT projection data corresponding to the pre-procedural CT images with the virtual metal object projection data using a beam hardening model to insert beam hardening effects attributable to the reference metal object and a noise model to insert noise effects attributable to the reference metal object; and reconstructing the pre-procedural CT images from the combined projection data.

5. The method of claim 4, wherein the noise model inserts both quantum noise and electronic noise.

6. A method for generating an image that depicts a virtual metal object and corresponding artifacts, the method comprising:

(a) accessing computed tomography (CT) projection data with a computer system, the CT projection data being acquired from a subject using a CT imaging system;

(b) accessing virtual metal object projection data with the computer system, the virtual metal object projection data comprising a forward projection of a virtual model of a metal object;

(c) generating combined projection data by combining the CT projection data and the virtual metal object projection data while using a beam hardening model to account for beam hardening effects attributable to the virtual model of the metal object in the combined projection data and a noise model to account for noise effects attributable to the virtual model of the metal object in the combined projection data, wherein the noise model inserts both quantum noise and electronic noise; and (d) reconstructing an image from the combined projection data, wherein the image depicts anatomy of the subject, the virtual metal object, and artifacts corresponding to the virtual metal object.

7. The method of claim 6, wherein the beam hardening model is estimated using the virtual metal object projection data and the CT projection data.

8. The method of claim 7, wherein the beam hardening model is estimated by:

computing an expected x-ray spectrum corresponding to when the metal object is physically present; and computing a mass attenuation coefficient for each line integral intersecting the virtual model of the metal object using the expected x-ray spectrum.

9. The method of claim 8, wherein using the beam hardening model to increase beam hardening effects attributable to the virtual model of the metal object comprises scaling each projection in the CT projection data that intersects the virtual model of the metal object in the virtual metal object projection data using a ratio computed using the beam hardening model.

10. A method for generating a metal artifact reduced image, the method comprising:

(a) accessing computed tomography (CT) image data with a computer system, the CT image data being acquired from a subject using a CT imaging system and depicting anatomy of the subject, a metal object present in the subject, and artifacts caused by the metal object;

(b) accessing a first trained neural network with the computer system, the first trained neural network being trained on training data in order to separate anatomy from metal objects and artifacts caused by metal objects;

(c) inputting the CT image data to the first trained neural network, generating output as anatomy image data depicting the anatomy of the subject and artifact containing metal object image data depicting the metal object and artifacts caused by the metal object;

(d) accessing a second trained neural network with the computer system, the second trained neural network being trained on training data in order to separate metal objects from artifacts caused by metal objects;

(e) inputting the artifact containing metal object image data to the second trained neural network, generating output as metal object image data depicting the metal object and artifact image data depicting the artifacts caused by the metal object; and (f) generating a combined image by combining the anatomy image data and the metal object image data with the computer system, wherein the combined image depicts the anatomy of the subject and the metal object without the artifacts caused by the metal object.

11. The method of claim 10, wherein the first neural network is a convolutional neural network.

12. The method of claim 10, wherein the first neural network is trained on training data comprising CT images to which virtual metal object data have been inserted.

13. The method of claim 12, wherein the CT images are pre-procedural CT images acquired from the subject when the metal object is not present in the subject, wherein the pre-procedural CT images do not depict the metal object.

14. The method of claim 12, wherein the virtual metal object data are inserted to the pre-procedural CT images by:

forward projecting a virtual model of a reference metal object to generate virtual metal object projection data;

generating combined projection data by combining CT projection data corresponding to the pre-procedural CT images with the virtual metal object projection data using a beam hardening model to insert beam hardening effects attributable to the reference metal object and a noise model to insert noise effects attributable to the reference metal object; and reconstructing the pre-procedural CT images from the combined projection data.

15. The method of claim 14, wherein the noise model inserts both quantum noise and electronic noise.

16. The method of claim 10, wherein the second neural network is a convolutional neural network.

17. The method of claim 10, wherein the second neural network is trained on training data comprising CT images that depict a phantom and a metal object.

18. The method of claim 17, wherein the training data on which the second neural network is trained further comprise segmented image data that segments the phantom from the metal object.

19. The method of claim 10, wherein the anatomy image data and the metal object image data are combined by adding the anatomy image data and the metal object image data.

20. A method for generating a metal artifact reduced image, the method comprising:

(a) accessing computed tomography (CT) image data with a computer system, the CT image data being acquired from a subject using a CT imaging system and depicting anatomy of the subject, a metal object present in the subject, and artifacts caused by the metal object;

(b) accessing a trained neural network with the computer system, the trained neural network being trained on training data in order to separate anatomy and metal objects from artifacts caused by metal objects, wherein the neural network is trained on training data comprising artifact-corrupted image data comprising CT images to which metal object mask data have been inserted in an image domain, and artifact-uncorrupted image data comprising the CT images to which the metal object mask data have been inserted in the image domain; and (c) inputting the CT image data to the trained neural network, generating output as artifact-reduced image data depicting the anatomy of the subject and the metal object, wherein the artifacts caused by the metal object are reduced.

21. The method of claim 20, wherein the artifact-uncorrupted image data are generated by:

accessing first image data comprising images depicting a first uniform background material having a first x-ray attenuation value;

accessing second image data comprising images depicting the first uniform background material to which at least one metallic object has been inserted;

generating a first metal object mask by subtracting the first and second image data;

generating the artifact-uncorrupted image data by applying the first metal object mask to subject image data depicting a subject;

and wherein the artifact-corrupted image data are generated by:

accessing third image data comprising images depicting a second uniform background material having a second x-ray attenuation value that is higher than the first x-ray attenuation value;

accessing fourth image data comprising images depicting the second uniform background material to which the at least one metallic object has been inserted;

generating a second metal object mask by subtracting the third and fourth image data; and generating the artifact-corrupted image data by applying the second metal object mask to the subject image data.

22. The method of claim 21, wherein the first uniform background material is air and the second uniform background material is water.

* * * * *